US012666247B2

(12) United States Patent
Das et al.

(10) Patent No.: US 12,666,247 B2
(45) Date of Patent: Jun. 23, 2026

(54) SUBSCRIBER IDENTITY MODULE SWITCHING BASED ON PREDICTED UTILITY

(71) Applicant: QUALCOMM Incorporated, San Diego, CA (US)

(72) Inventors: Soumya Das, San Diego, CA (US); Mohammad Nekoui, Escondido, CA (US); Mohsen Bahrami, Carlsbad, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 290 days.

(21) Appl. No.: 18/416,859

(22) Filed: Jan. 18, 2024

(65) Prior Publication Data

US 2025/0240614 A1 Jul. 24, 2025

(51) Int. Cl.
*H04W 8/18* (2009.01)

(52) U.S. Cl.
CPC .................................... *H04W 8/18* (2013.01)

(58) Field of Classification Search
CPC ......... H04W 4/50; H04W 8/18; H04W 48/18; H04W 88/06
See application file for complete search history.

(56) References Cited

U.S. PATENT DOCUMENTS 8,626,165 B1 * 1/2014 Narasimhan .......... H04W 12/35
455/418
11,743,352 B1 * 8/2023 Thomas ................... H04W 8/20

2015/0142313 A1 * 5/2015 Haberman ......... G01C 21/3694
701/533
2016/0380820 A1 * 12/2016 Horvitz ................. H04W 16/28
370/254
2017/0238346 A1 8/2017 Egner et al.
2022/0295343 A1 9/2022 Pefkianakis et al.

FOREIGN PATENT DOCUMENTS

WO WO-2022187783 A1 9/2022

OTHER PUBLICATIONS

International Search Report and Written Opinion—PCT/US2024/062150—ISA/EPO—May 2, 2025.

* cited by examiner

*Primary Examiner* — Sam Bhattacharya
(74) *Attorney, Agent, or Firm* — Holland & Hart LLP

(57) ABSTRACT

Methods, systems, and devices for wireless communications are described. A user equipment (UE) may evaluate a first and second utility value for a first and second subscriber identity module (SIM) associated with a first and second service subscription respectively for each zone of a set of zones along a route of the UE. The first utility value and the second utility value may be based on a throughput level and a network load of the service subscriptions for each zone of the set of zones that includes zones that the UE is predicted to travel through. Therefore, the UE compares the first utility value to the second utility value to determine a service subscription switch condition for each zone for the UE to switch between the SIMs of the UE based on a function of the service subscription switch conditions for the set of zones.

24 Claims, 10 Drawing Sheets

User Equipment

Zone

400

Figure 10:
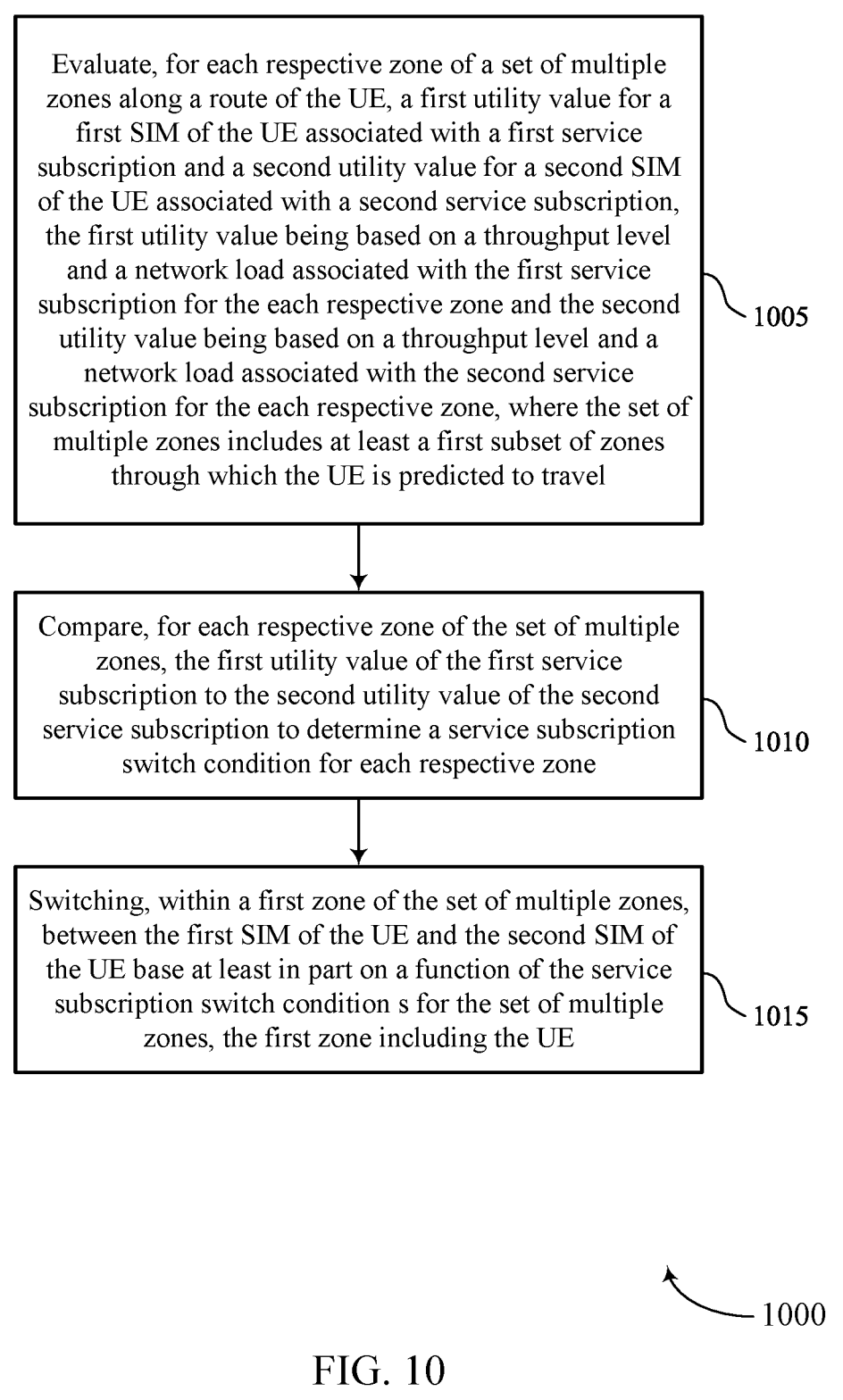

Evaluate, for each respective zone of a set of multiple zones along a route of the UE, a first utility value for a first SIM of the UE associated with a first service subscription and a second utility value for a second SIM of the UE associated with a second service subscription, the first utility value being based on a throughput level and a network load associated with the first service subscription for the each respective zone and the second utility value being based on a throughput level and a network load associated with the second service subscription for the each respective zone, where the set of multiple zones includes at least a first subset of zones through which the UE is predicted to travel

1005

Compare, for each respective zone of the set of multiple zones, the first utility value of the first service subscription to the second utility value of the second service subscription to determine a service subscription switch condition for each respective zone

1010

Switching, within a first zone of the set of multiple zones, between the first SIM of the UE and the second SIM of the UE base at least in part on a function of the service subscription switch condition s for the set of multiple zones, the first zone including the UE

SUBSCRIBER IDENTITY MODULE SWITCHING BASED ON PREDICTED UTILITY

FIELD OF TECHNOLOGY

The following relates to wireless communications, including subscriber identity module switching based on predicted utility.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support subscriber identity module switching based on predicted utility. For example, the described techniques provide for a user equipment (UE) to evaluate a first utility value for a first subscriber identity module (SIM) of the UE that is associated with a first service subscription and a second utility value for a second SIM of the UE that is associated with a second service subscription for each respective zone of a set of zones along a route of the UE. The first utility value may be based on a throughput level and a network load associated with the first service subscription for each respective zone and the second utility value may be based on a throughput level and a network load associated with the second service subscription for each respective zone. In some cases, the set of zones may include at least a first subset of zones through which the UE is predicted to travel. In addition, the UE may compare the first utility value of the first service subscription to the second utility value of the second service subscription for each respective zone of the set of zones to determine a service subscription switch condition for each respective zone. Thus, the UE may switch between the first SIM of the UE and the second SIM of the UE within a first zone of the set of zones where the first zone includes the UE. Further, the switch may be based on a function of the service subscription switch conditions for the set of zones. Thus, the UE may switch between SIMs of the UE while considering the one or more future (e.g., predicted) zones.

A method for wireless communications by a UE is described. The method may include evaluating, for each respective zone of a set of multiple zones along a route of the UE, a first utility value for a first SIM of the UE associated with a first service subscription and a second utility value for a second SIM of the UE associated with a second service subscription, the first utility value being based on a throughput level and a network load associated with the first service subscription for the each respective zone and the second utility value being based on a throughput level and a network load associated with the second service subscription for the each respective zone, where the set of multiple zones includes at least a first subset of zones through which the UE is predicted to travel, comparing, for each respective zone of the set of multiple zones, the first utility value of the first service subscription to the second utility value of the second service subscription to determine a service subscription switch condition for each respective zone, and switching, within a first zone of the set of multiple zones, between the first SIM of the UE and the second SIM of the UE based on a function of the service subscription switch condition s for the set of multiple zones, the first zone including the UE.

A UE for wireless communications is described. The UE may include one or more memories storing processor executable code, and one or more processors coupled with the one or more memories. The one or more processors may individually or collectively operable to execute the code to cause the UE to evaluate, for each respective zone of a set of multiple zones along a route of the UE, a first utility value for a first SIM of the UE associated with a first service subscription and a second utility value for a second SIM of the UE associated with a second service subscription, the first utility value being based on a throughput level and a network load associated with the first service subscription for the each respective zone and the second utility value being based on a throughput level and a network load associated with the second service subscription for the each respective zone, where the set of multiple zones includes at least a first subset of zones through which the UE is predicted to travel, compare, for each respective zone of the set of multiple zones, the first utility value of the first service subscription to the second utility value of the second service subscription to determine a service subscription switch condition for each respective zone, and switching, within a first zone of the set of multiple zones, between the first SIM of the UE and the second SIM of the UE base at least in part on a function of the service subscription switch condition s for the set of multiple zones, the first zone including the UE.

Another UE for wireless communications is described. The UE may include means for evaluating, for each respective zone of a set of multiple zones along a route of the UE, a first utility value for a first SIM of the UE associated with a first service subscription and a second utility value for a second SIM of the UE associated with a second service subscription, the first utility value being based on a throughput level and a network load associated with the first service subscription for the each respective zone and the second utility value being based on a throughput level and a network load associated with the second service subscription for the each respective zone, where the set of multiple zones includes at least a first subset of zones through which the UE is predicted to travel, means for comparing, for each respective zone of the set of multiple zones, the first utility value of the first service subscription to the second utility value of the second service subscription to determine a service subscription switch condition for each respective zone, and means for switching, within a first zone of the set of multiple zones, between the first SIM of the UE and the second SIM of the UE based on a function of the service subscription switch conditions for the set of multiple zones, the first zone including the UE.

A non-transitory computer-readable medium storing code for wireless communications is described. The code may include instructions executable by one or more processors to evaluate, for each respective zone of a set of multiple zones along a route of the UE, a first utility value for a first SIM of the UE associated with a first service subscription and a second utility value for a second SIM of the UE associated with a second service subscription, the first utility value being based on a throughput level and a network load associated with the first service subscription for the each respective zone and the second utility value being based on a throughput level and a network load associated with the second service subscription for the each respective zone, where the set of multiple zones includes at least a first subset of zones through which the UE is predicted to travel, compare, for each respective zone of the set of multiple zones, the first utility value of the first service subscription to the second utility value of the second service subscription to determine a service subscription switch condition for each respective zone, and switching, within a first zone of the set of multiple zones, between the first SIM of the UE and the second SIM of the UE base at least in part on a function of the service subscription switch condition s for the set of multiple zones, the first zone including the UE.

Some examples of the method, UEs, and non-transitory computer-readable medium described herein may further include operations, features, means, or instructions for calculating, for each zone of the set of multiple zones, a hysteresis value to be used to determine the service subscription switch condition for each zone of the set of multiple zones.

Some examples of the method, UEs, and non-transitory computer-readable medium described herein may further include operations, features, means, or instructions for evaluating, for each respective zone of the set of multiple zones, a first service subscription cost for the first service subscription associated with the first SIM and a second service subscription cost for the second service subscription associated with the second SIM.

In some examples of the method, UEs, and non-transitory computer-readable medium described herein, the service subscription switch condition, for each respective zone of the set of multiple zones, may be determined based on a hysteresis value that may be based at least in part a service subscription cost of a respective service subscription of a respective SIM that may be active at the UE.

Some examples of the method, UEs, and non-transitory computer-readable medium described herein may further include operations, features, means, or instructions for comparing, for each respective zone of the set of multiple zones, both the first utility value of the first service subscription that may be associated with the first service subscription cost and the second utility value of the second service subscription that may be associated with the second service subscription cost to a utility value threshold, the second service subscription cost being different from the first service subscription cost, where a hysteresis value to be used to determine the service subscription switch condition for each zone of the set of multiple zones may be based on the first utility value, the second utility value, or both satisfying the utility value threshold and on a service subscription cost of a respective service subscription of a respective SIM that may be active at the UE.

In some examples of the method, UEs, and non-transitory computer-readable medium described herein, comparing the first utility value to the second utility value may include operations, features, means, or instructions for calculating one or more metrics including a quantity of service subscription switches over the route, an average rate of service subscription switches, an average quantity of zones between service subscription switches, an average utility of the route with one or more service subscription switches, an average utility of the route for the first service subscription, an average utility of the route for the second service subscription, or any combination thereof, where the service subscription switch condition may be based on the one or more metrics.

Some examples of the method, UEs, and non-transitory computer-readable medium described herein may further include operations, features, means, or instructions for calculating a hysteresis value to be used to determine the service subscription switch condition for each zone of the set of multiple zones, a quantity of zones in the first subset of zones, or both, based on a quantity of service subscription switches performed before the first zone of the set of multiple zones satisfying a threshold quantity of service subscription switches.

Some examples of the method, UEs, and non-transitory computer-readable medium described herein may further include operations, features, means, or instructions for comparing, for each respective zone of the set of multiple zones, the first utility value of the first service subscription and the second utility value of the second service subscription to a utility value threshold, where a hysteresis value to be used to determine the service subscription switch condition for each zone of the set of multiple zones may be based on the first utility value, the second utility value, or both satisfying the utility value threshold.

Some examples of the method, UEs, and non-transitory computer-readable medium described herein may further include operations, features, means, or instructions for assigning, for each respective zone of the set of multiple zones, a respective weight to the service subscription switch condition for each respective zone and calculating, for each respective zone of the set of multiple zones, a service subscription switch metric that may be based on the respective weight assigned to each respective service subscription switch condition for each respective zone and each respective service subscription switch condition for each respective zone, where switching between the first SIM of the UE and the second SIM of the UE in the first zone may be based on the service subscription switch metric for the first zone satisfying a service subscription switch metric threshold.

In some examples of the method, UEs, and non-transitory computer-readable medium described herein, a quantity of zones in the first subset of zones of the set of multiple zones may be based on a speed of movement of the UE.

Some examples of the method, UEs, and non-transitory computer-readable medium described herein may further include operations, features, means, or instructions for switching between the first SIM of the UE and the second SIM of the UE may be based on the function of the service subscription switch condition for each respective zone indicating for the UE to switch between the first SIM of the UE and the second SIM of the UE.

In some examples of the method, UEs, and non-transitory computer-readable medium described herein, each respective zone of the set of multiple zones may be based on respective sets of geographic coordinates for each respective zone of the set of multiple zones.

switching based on predicted utility in accordance with one or more aspects of the present disclosure.

Figure 3:
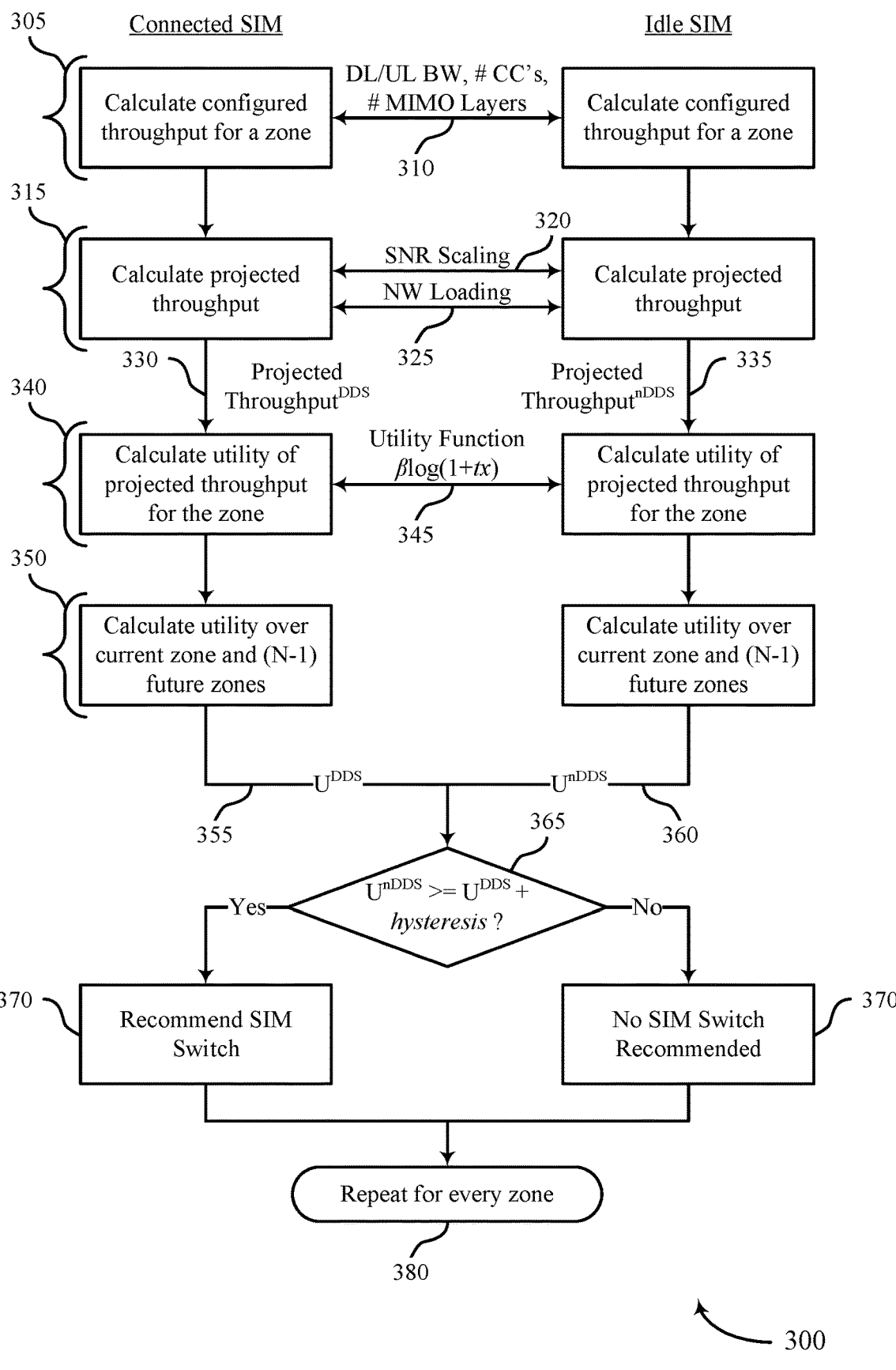

FIG. 3 shows an example of a flowchart that supports subscriber identity module switching based on predicted utility in accordance with one or more aspects of the present disclosure.

Figure 4:
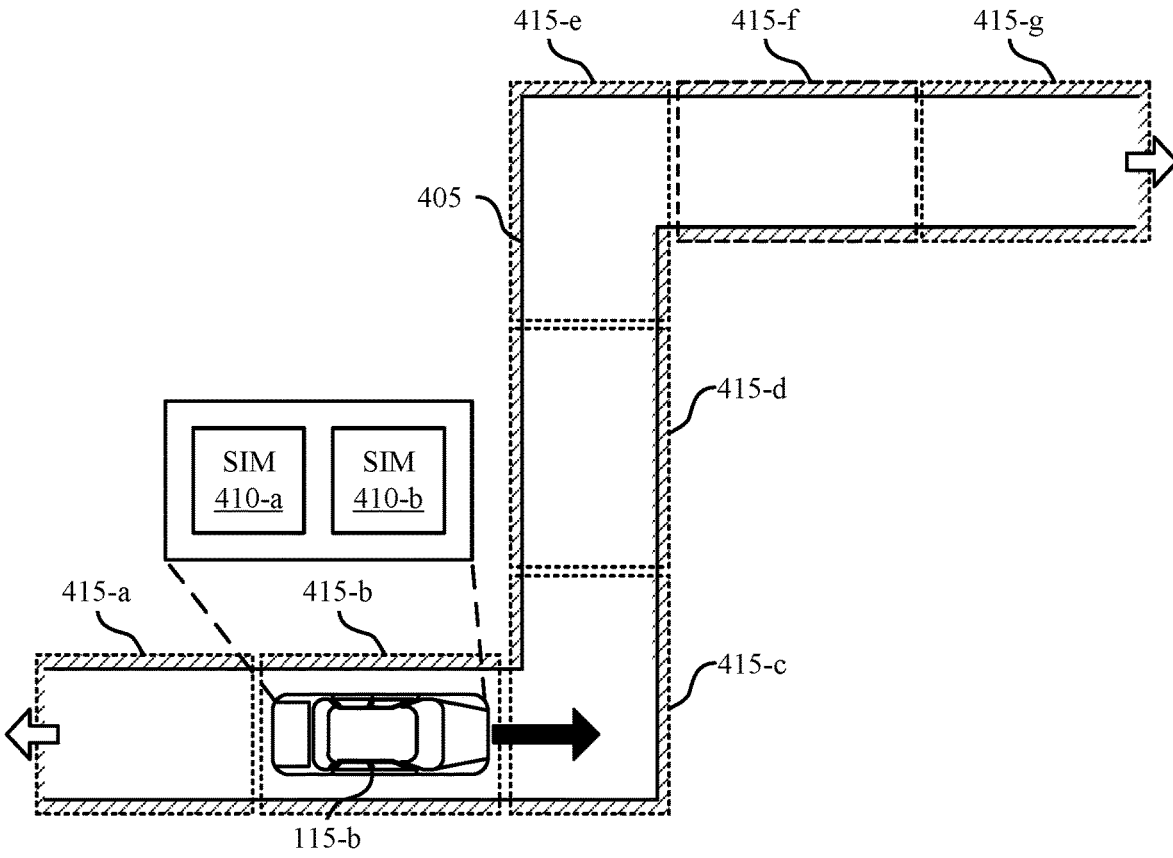
Figure 4:
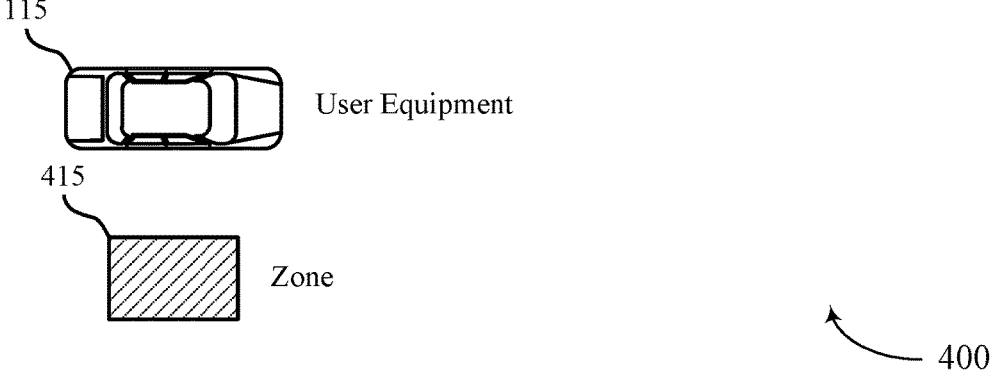

FIG. 4 shows an example of a user equipment (UE) route diagram that supports subscriber identity module switching based on predicted utility in accordance with one or more aspects of the present disclosure.

Figure 5:
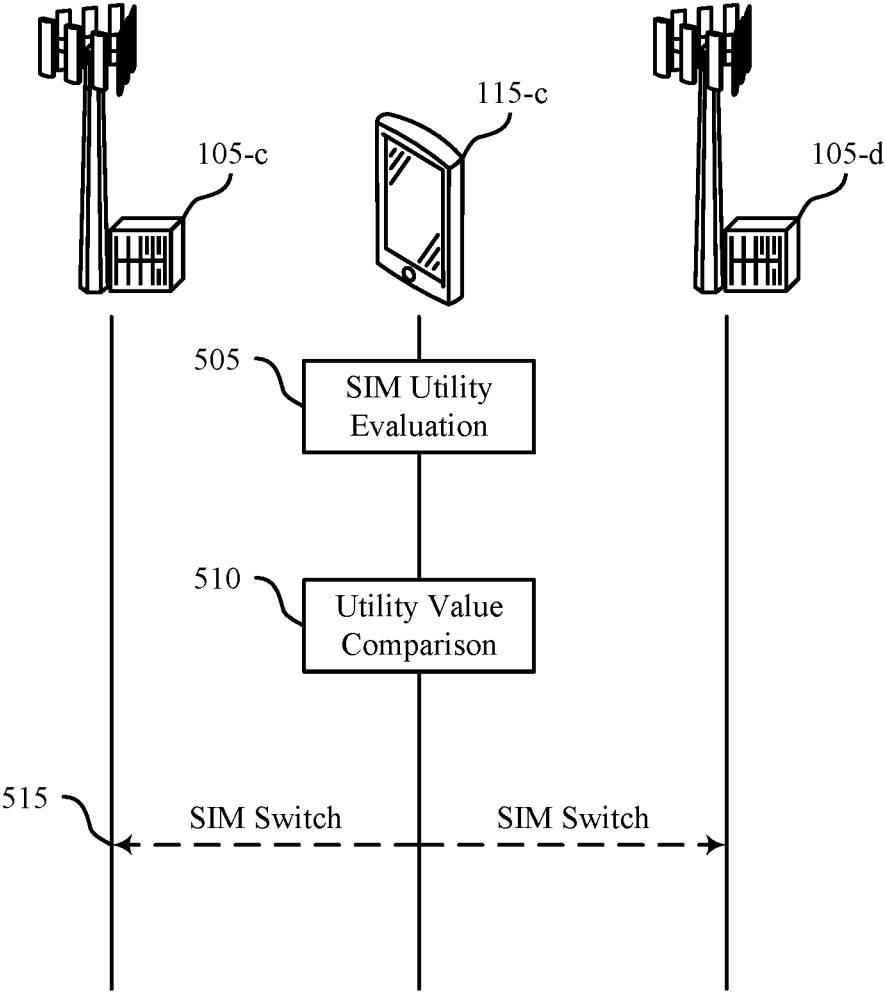

FIG. 5 shows an example of a process flow that supports subscriber identity module switching based on predicted utility in accordance with one or more aspects of the present disclosure.

Figure 6:
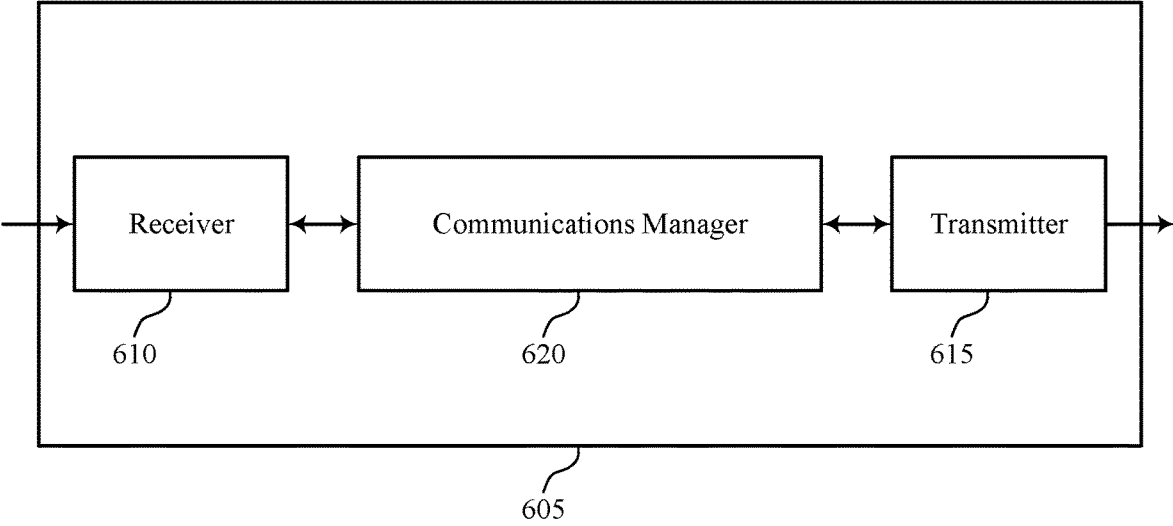
Figure 7:
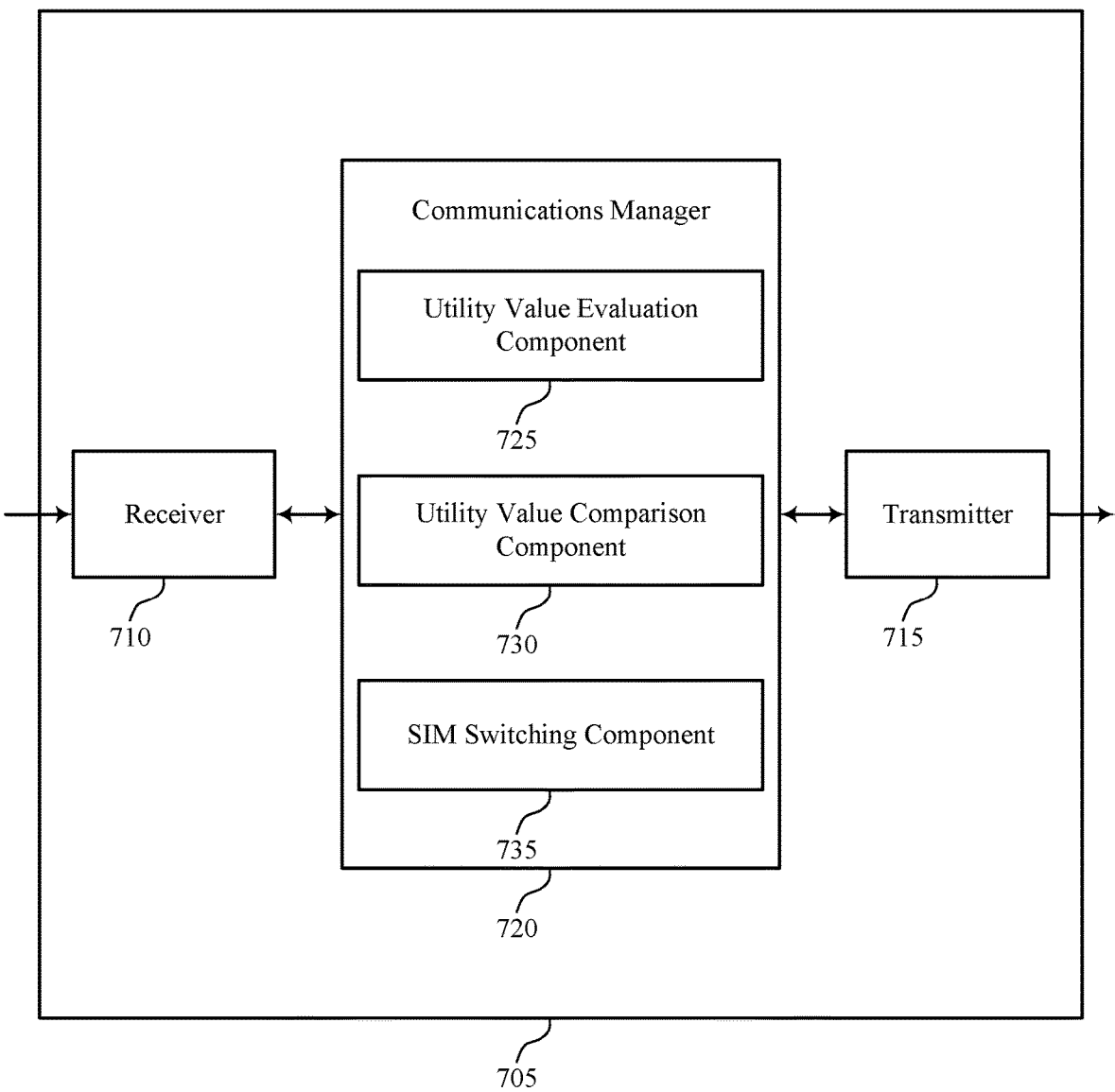

FIGS. 6 and 7 show block diagrams of devices that support subscriber identity module switching based on predicted utility in accordance with one or more aspects of the present disclosure.

Figure 8:
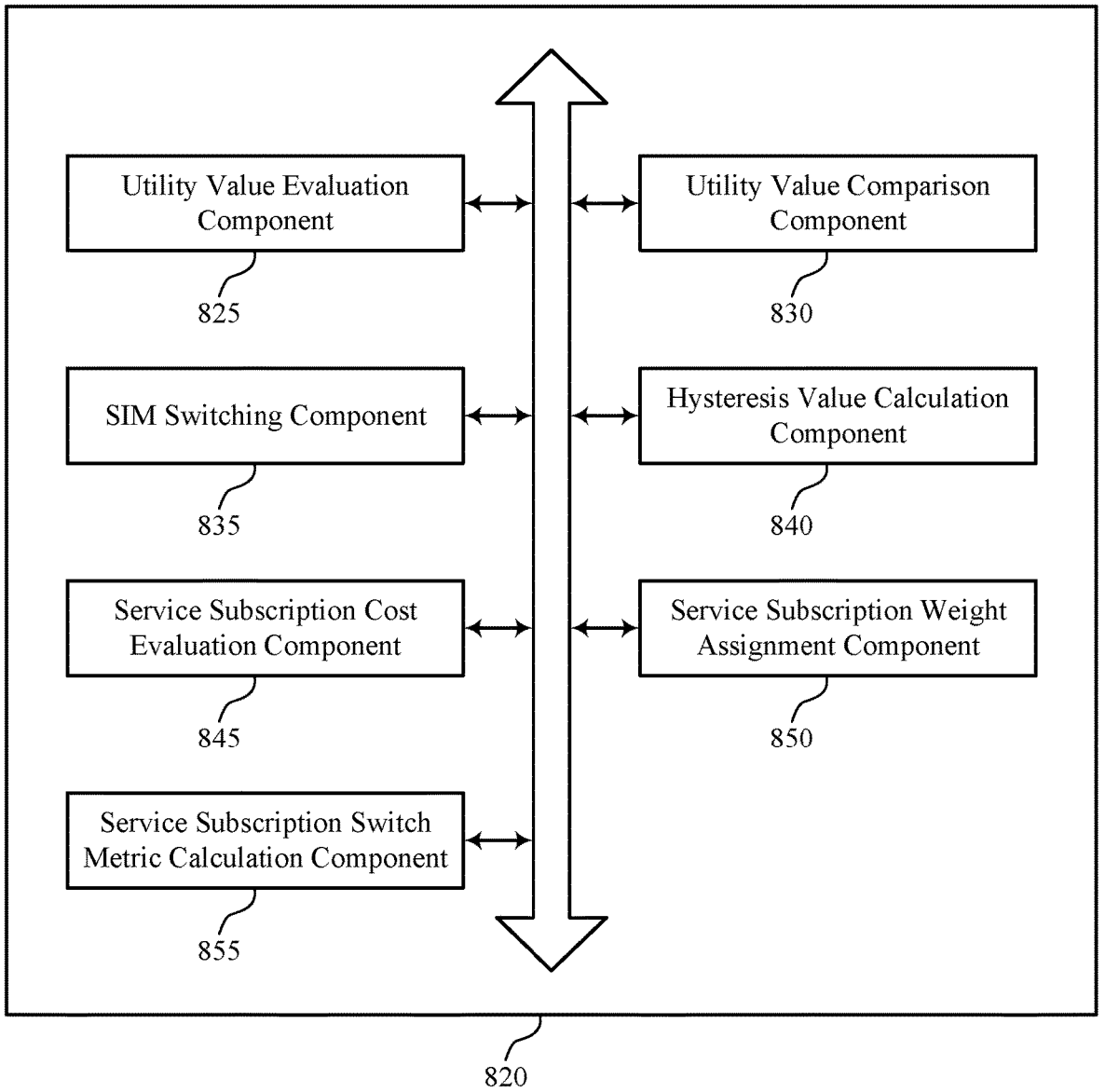

FIG. 8 shows a block diagram of a communications manager that supports subscriber identity module switching based on predicted utility in accordance with one or more aspects of the present disclosure.

Figure 9:
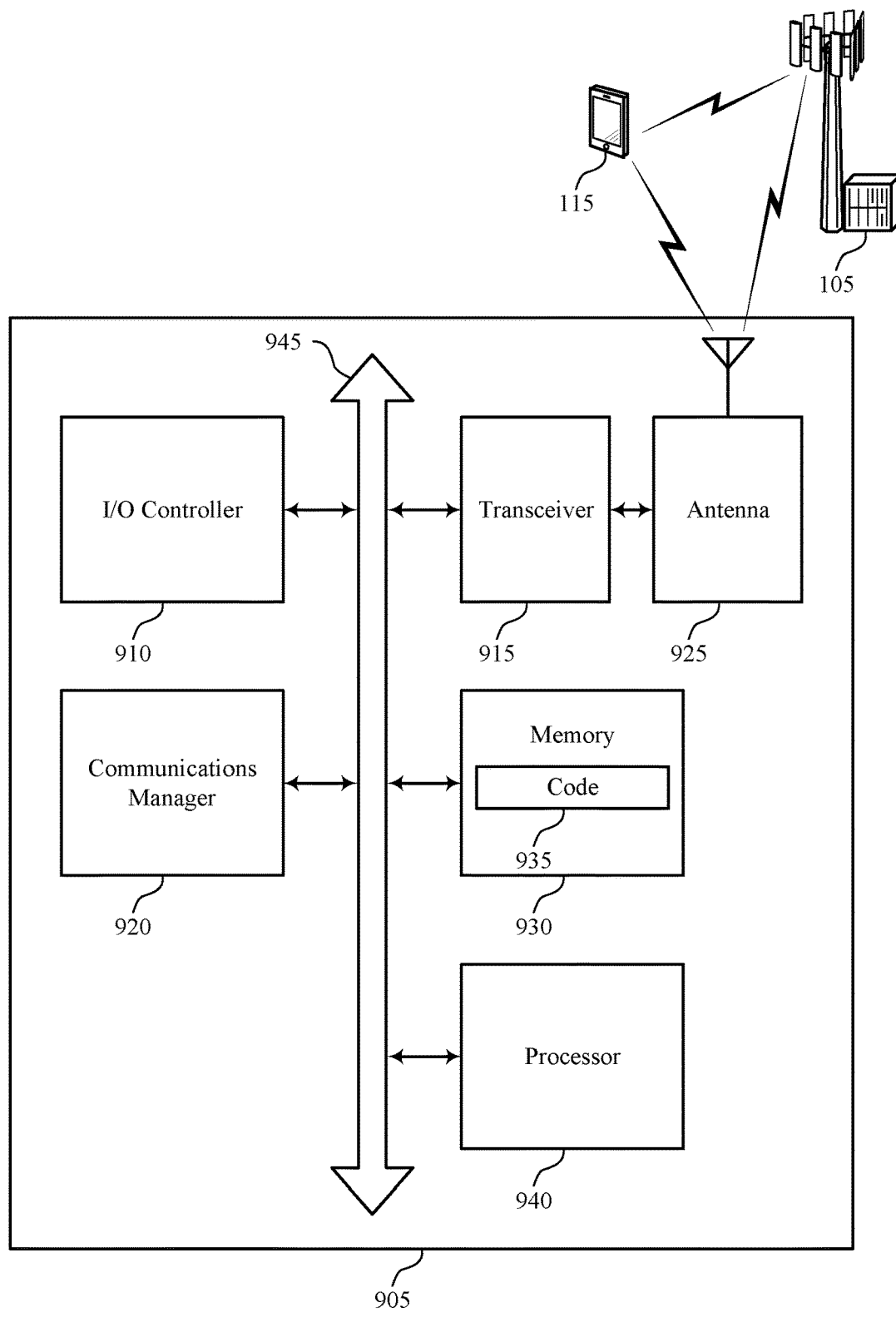

FIG. 9 shows a diagram of a system including a device that supports subscriber identity module switching based on predicted utility in accordance with one or more aspects of the present disclosure.

FIG. 10 shows a flowchart illustrating methods that support subscriber identity module switching based on predicted utility in accordance with one or more aspects of the present disclosure.

DETAILED DESCRIPTION

In some wireless communication systems, user equipments (UEs) may be configured with multiple services or operators for wireless communications. For example, a UE may be configured with multiple subscriber identity modules (e.g., SIMs). UEs configured with multiple SIMs may be referred to as dual SIM UEs. A dual SIM UE may be capable of subscribing to two different network operators, two different services of the same network operator, or any combination thereof. In some cases, the UE may switch between a first SIM and a second SIM at different times or in different zones. A zone may be a geographic area that is defined by a set of geographic coordinates that outline the borders of a respective zone. Thus, the UE may travel within a set of zones or geographic areas on a route where one or more network service providers may service each zone of the set of zones. While traveling, the UE may determine whether to switch from using a first SIM associated with a service subscription of a first network service provider to a second SIM associated with a service subscription of a second network service provider. For example, a vehicle UE (e.g., a manually driven vehicle or an autonomous vehicle) may switch between SIMs within a route from a source to a destination.

The current framework for SIM (e.g., subscription) switch recommendations may be based on the current conditions of a UE such that a UE determines to switch between SIMs based on the network conditions within a current geographic zone (e.g., a current zone). However, while using such a SIM switching recommendation framework, the UE may be unable to utilize information regarding the network conditions of previously encountered zones, of future zones, or both. Thus, the current SIM switching recommendation framework may result in relatively accurate determinations, or frequent network switching, which may result in reduced efficiency. Therefore, the techniques of the present disclosure describe a framework that enables a UE to use the network conditions and capabilities of the UEs current zone along with the network conditions/capabilities of past zones, future zones, or both.

For example, in accordance with the techniques of the present disclosure, the UE may be capable of determining whether to switch from a first service subscription of a first SIM to a second service subscription of a second SIM within a current zone. To determine whether the UE should perform a SIM switch the UE may measure a utility value for both the first service subscription of the first SIM and the second subscription of a second SIM for the current zone, a set of M past zones, a set of N future zones, or any combination thereof. The utility value for a respective zone may be a normalized value (e.g., a value between 0 and 1) of the throughput, the network loading, the signal-to-noise ratio (SNR), or any combination thereof, of the respective zone. Therefore, the UE may use a first utility value of the first service subscription of the first SIM and a second utility value of the second service subscription of the second SIM to compare the performance of the first SIM and the second SIM within a respective zone.

Based on the comparison, the UE may determine whether the UE should remain on the currently active SIM and corresponding service subscription or perform a SIM switch within a respective zone. The UE may perform such comparison for each zone of the set of zones and use an algorithm of a set of algorithms to determine whether the UE should perform a SIM switch. Such algorithms may use the respective utility values of the first SIM and the second SIM along with one or more parameters, such as the cost of a respective subscription, a service subscription switch rate, service subscription targets, or any combination thereof. Therefore, using the techniques of the present disclosure the UE may be capable of more efficiently and accurately determining whether to switch between a first SIM and a second SIM in the current zone, thus resulting in more efficient and reliable wireless communications between the UE and one or more network entities.

Aspects of the disclosure are initially described in the context of wireless communications systems. Additional aspects of the disclosure are described with reference to a wireless communications system, a UE route diagram, a flowchart, and a process flow. Aspects of the disclosure are further illustrated by and described with reference to apparatus diagrams, system diagrams, and flowcharts that relate to subscriber identity module switching based on predicted utility.

Figure 1:
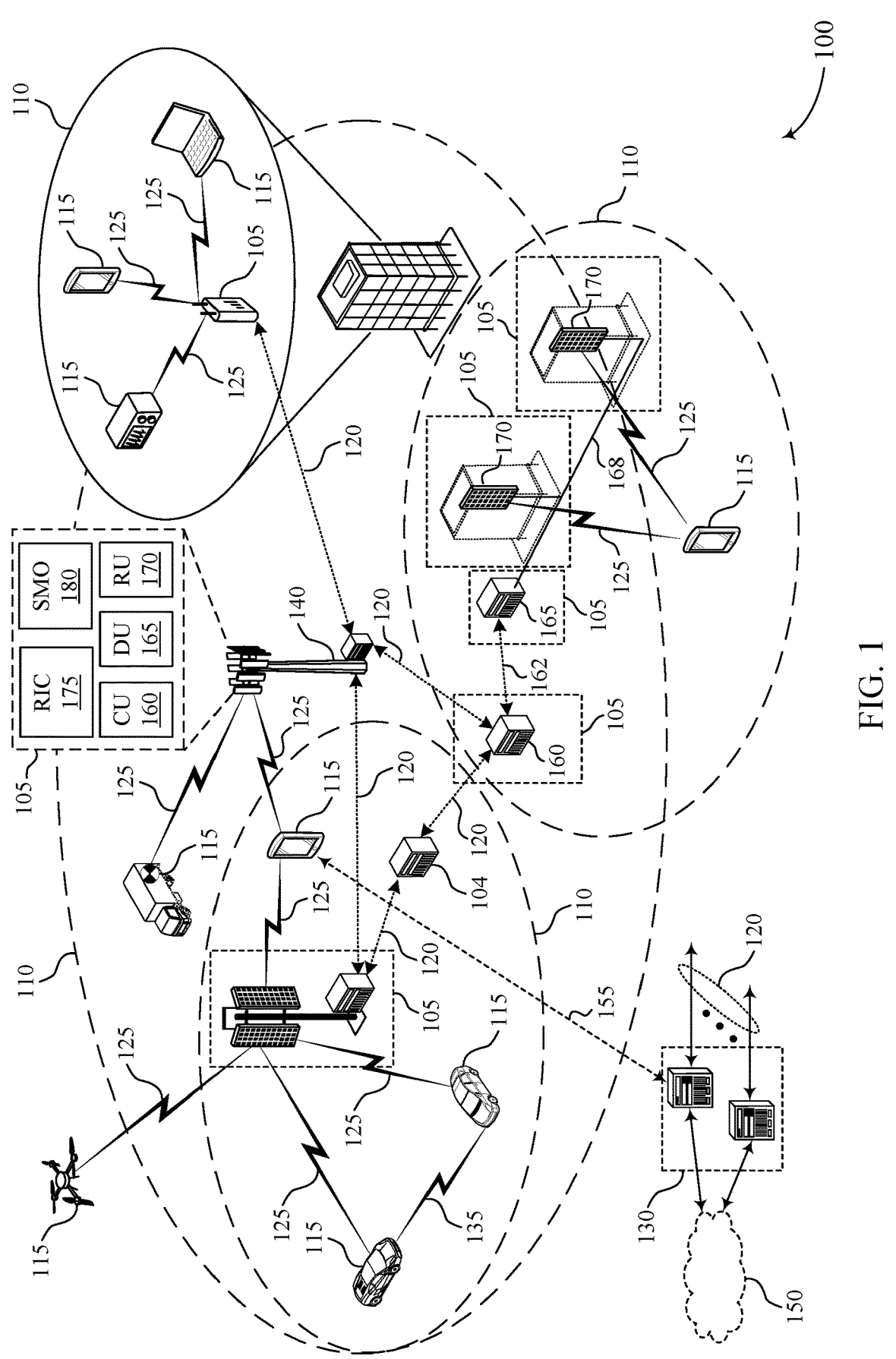
FIGS. 1 and 2 show examples of a wireless communications system that supports subscriber identity module (SIM)

FIG. 1 shows an example of a wireless communications system 100 that supports subscriber identity module switching based on predicted utility in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support subscriber identity module switching based on predicted utility as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers (CCs) and one or more uplink CCs according to a carrier aggregation configuration. Carrier aggregation may be used with both frequency division duplexing (FDD) and time division duplexing (TDD) CCs. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and Ne may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple CCs.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with CCs operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples of the wireless communications system 100, UEs 115 may be configured with multiple services or operators for wireless communications. For example, a UE 115 may be configured with multiple SIMs. UEs with multiple SIMs may be referred to as dual SIM UEs 115. A dual SIM UE 115 may be capable of subscribing to two different network operators, two different services of the same network operator, or any combination thereof serviced by a network entity 105. In some cases, the UE 115 may switch between a first SIM and a second SIM at different times or in different zones. A zone may be a geographic coverage area 110 that is defined by a set of geographic coordinates that outline the borders of a respective zone. Thus, the UE 115 may travel within a set of zones or geographic areas on a route where one or more network service providers may service each zone of the set of zones. While traveling, the UE 115 may determine whether to switch from using a first SIM associated with a service subscription of a first network service provider to a second SIM associated with a service subscription of a second network service provider. For example, a vehicle UE 115 (e.g., a manually driven vehicle or an autonomous vehicle) may switch between SIMs within a route from a source to a destination.

The current framework for SIM (e.g., subscription) switch recommendations may be based on the current conditions of a UE 115 such that a UE 115 determines to switch between SIMs based on the network conditions within a current geographic zone (e.g., a current zone). However, while using such SIM switching recommendation framework, the UE 115 may be unable to utilize information regarding the network conditions of previously encountered zones, of future zones, or both. Thus, the current SIM switching recommendation framework may result in relatively less accurate determinations or frequent switching, which may lead to reduced efficiency. Therefore, the techniques of the present disclosure describes a framework that enables a UE 115 to use the network conditions and capabilities of the current zone of the UE 115 along with the network conditions/capabilities of past zones, future zones, or both.

For example, in accordance with the techniques of the present disclosure, the UE 115 may be capable of determining whether to switch from a first service of a first SIM to a second service subscription of a second SIM within a current zone. To determine whether the UE 115 should perform a SIM switch the UE 115 may measure respective utility values for the first service subscription of the first SIM and the second subscription of a second SIM for the current zone, a set of M past zones, a set of N future zones, or any combination thereof. The utility value for a respective zone may be a normalized value (e.g., a value between 0 and 1) of the throughput, the network loading, the signal noise ratio (SNR), or any combination thereof, of the respective zone. Therefore, the UE 115 may use a first utility value of the first service subscription of the first SIM and a second utility value of the second service subscription of the second SIM to compare the performance of the first SIM and the second SIM within a respective zone.

Based on the comparison, the UE 115 may determine whether the UE 115 should remain on the currently active SIM and corresponding service subscription or perform a SIM switch within a respective zone. The UE 115 may perform such comparison for each zone of the set of zones and use an algorithm of a set of algorithms to determine whether the UE 115 should perform a SIM switch. Such algorithms may use the respective utility values of the first SIM and the second SIM along with one or more parameters, such as the cost of a respective SIM, a service subscription switch rate, service subscription targets, or any combination thereof. Therefore, using the techniques of the present disclosure the UE 115 may be capable of more efficiently and accurately determining whether to switch between a first SIM and a second SIM in the current zone, thus resulting in more efficient and reliable wireless communications between the UE and one or more network entities.

Figure 2:
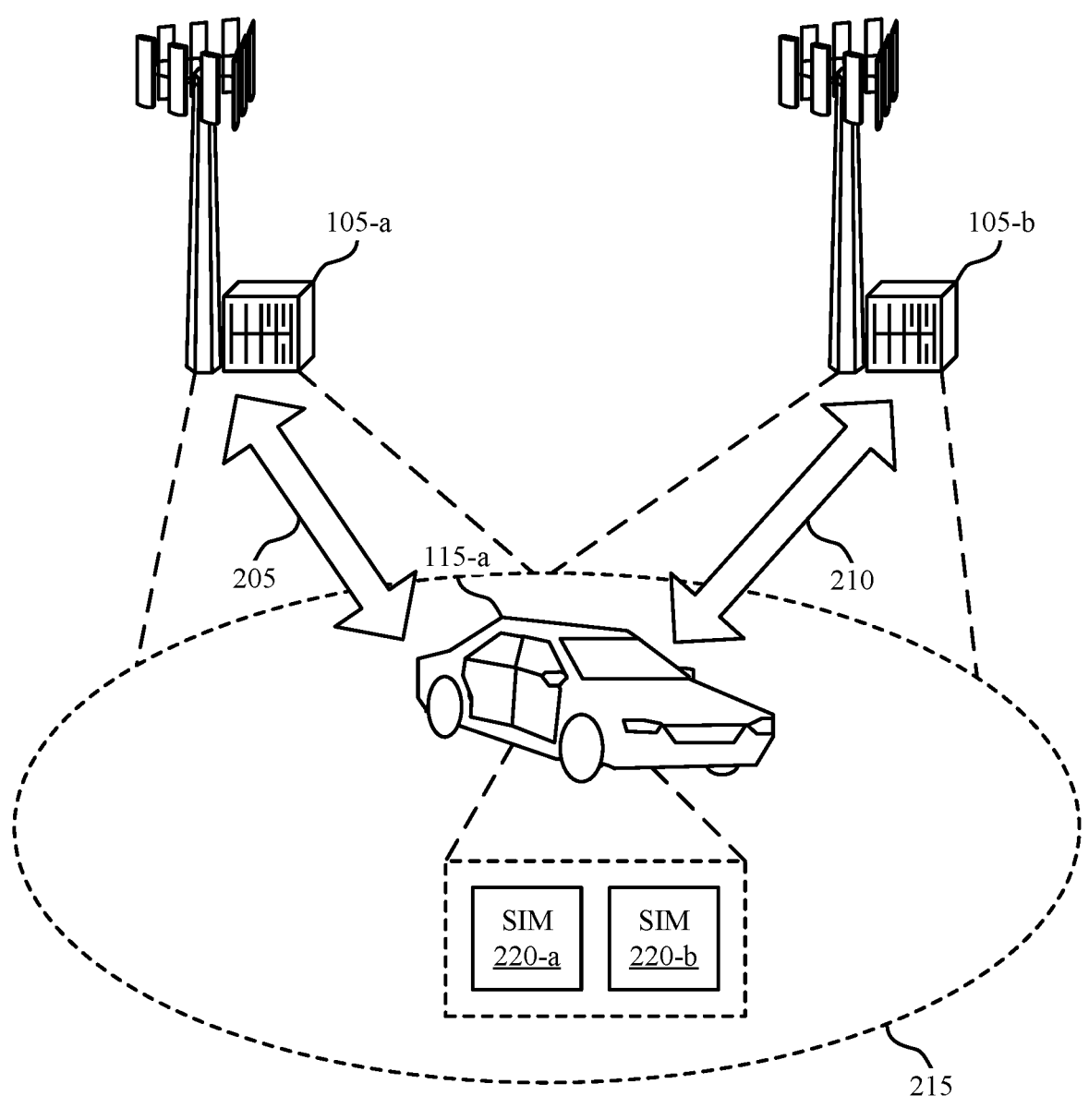

FIG. 2 shows an example of a wireless communications system 200 that supports SIM switching based on predicted utility in accordance with one or more aspects of the present disclosure. In some examples, the wireless communications system 200 may implement or be implemented by the wireless communications system 100. For example, the wireless communications system 200 may include a UE 115-*a* within a coverage area or zone 215, a network entity 105-*a*, and a network entity 105-*b*, which may be examples of devices described herein with reference to FIG. 1. Further, the network entity 105-*a* may communicate with the UE 115-*a* via a communication link 205 and the network entity 105-*b* may communicate with the UE 115-*a* via a communication link 210. In some examples, the communication link 205 and the communication link 210 may be examples of Uu links, sidelink links, backhaul links, D2D links, or some other type of communication links 125 described herein with reference to FIG. 1.

In some cases, the UE 115-*a* may be configured with one or more SIMs 220 that are associated with respective service subscriptions. For example, the UE 115-*a* may be a dual SIM UE 115 where the UE 115-*a* is configured with a SIM 220-*a* and a SIM 220-*b*. In some examples, the SIM 220-*a* may be associated with a first service subscription that subscribes to a service provided by the network entity 105-*a* and the SIM 220-*b* may be associated with a second service subscription that subscribes to a service provided by the network entity 105-*b*. For example, the network entity 105-*a* may provide a network service (e.g., a mobile service) to the SIM 220-*a* that is associated with the first service subscription, where the first service subscription subscribes to the network service of the network entity 105-*a*.

In some examples, the UE 115-*a* may switch between SIMs 220 during an operation of the UE 115-*a*. For example, if the UE 115-*a* is a vehicle UE 115, the UE 115-*a* may move at relatively high speeds resulting in the network and channel conditions of the UE 115-*a* changing relatively rapidly. Therefore, the UE 115-*a* may calculate a service subscription recommendation that is based on the current conditions of the UE 115-*a*. In some cases, the UE 115-*a* may use a decision making framework (e.g., an adaptive best access framework) that describes a procedure for a service subscription selection between two SIMs 220 (e.g., the SIM 220-*a* and the SIM 220-*b*).

Using such framework, the UE 115-*a* may be configured with a connected service subscription (e.g., an active data subscription) that corresponds to an active SIM 220 (e.g., the SIM 220-*a*). The other service subscription may be an inactive subscription (e.g., an idle data subscription) that corresponds to an inactive SIM 220 (e.g., the SIM 220-b). Based on the framework, the UE 115-a may record (e.g., measure and store) the throughput of a cell (e.g., a cell global identifier (CGI)) per service subscription of the SIM 220-a and the SIM 220-b. The UE 115-a may further update the throughput values based on a quantity of visits to the cell by the UE 115-a. A configured throughput for a cell may be a maximum possible throughput for a cell based on a current RRC configuration (e.g., based on downlink/uplink bandwidths, a quantity of CCs, and a quantity of MIMO layers) and on a physical layer structure (e.g., an NR physical layer structure). Further, the configured throughput may be composed from components from the master cell group and the secondary cell group for an evolved non-standalone dual connectivity (EN-DC) mobile network (e.g., a mobile network that allows for simultaneous 4G LTE and 5G NR connections). In addition, the UE 115-a may record the configured throughput at a cell per service subscription with a cell identifier (ID) as a key. Therefore, the UE 115-a may record the configured throughput at a cell for both the first service subscription associated with the SIM 220-a and the second service subscription associated with the SIM 220-b.

For future visits, the configured throughput may be scaled based on a SNR scaling factor where the SNR may be a measure of current condition in order to determine a projected throughput. In some examples, the projected throughput may be mapped to a utility measure using a utility function where utility is a measure of user experience. Further, the utility measure for both the first and second service subscriptions may be compared with a hysteresis bias for the active service subscription (e.g., the first service subscription of the first SIM 220-a) to prevent frequent SIM 220 switches or service subscription switches. Thus, the UE 115-a may calculate or determine a service subscription switching condition to determine whether the UE 115-a should switch between SIMs 220 such that the best cell may be used for each respective service subscription. In some cases, the UE 115-a may be configured with a single SIM 220 that can subscribe to multiple service subscriptions. For example, the SIM 220-a may be capable of subscribing to the service subscription of the network entity 105-a and of the network entity 105-b. Therefore, in some cases, the UE 115-a may perform a service subscription switch to switch from a first service subscription to a second service subscription. Further, when the UE 115-a is configured with two SIMs 220, switching between SIMs 220 may also include switching service subscriptions. Thus, it should be understood that a SIM 220 switch may also refer to a service subscription switch. It should also be understood that the present techniques may be applied to more than two SIMs 220, or more than two service subscriptions.

In some examples, the service subscription switching condition (e.g., SIM 220 switching condition) may be based on a conservative projection used for the non-active service subscription (e.g., the second service subscription of the second SIM 220-b) versus an aggressive projection used for the active service subscription. Further, the conservative projection may be relatively greater than the aggressive projection with a margin over an entire window for a modem to recommend a SIM 220 switch. Moreover, a final SIM 220 switch recommendation may be up to and decided by an access point (AP) (e.g., the UE 115-a). Additionally, or alternatively, the service subscription switching condition may be based on Equation 1 below that compares the utility, U, of a conservative configured throughput estimate of an idle data service or SIM 220, $$C_-^{idle},$$

to the utility of an aggressive configured throughput estimate of a connected data service or SIM 220, $$C_+^{conn.}$$

(e.g., where 'conn.' refers to 'connected'), and a threshold parameter, $\sigma$.

$$U\left(C_-^{idle}\right) > U(C_+^{conn.}) + \sigma \qquad (1)$$

Thus, as illustrated in Equation 1, if the utility of the conservative configured throughput estimate $$\left(U\left(C_-^{idle}\right)\right)$$

is greater than the aggressive configured throughput estimate and the threshold parameter $$(U(C_+^{conn.}) + \sigma)$$

the service subscription switching condition of the framework may indicate for the UE 115-a to perform a service subscription switch. Further, the UE 115-a may determine the service subscription switching recommendation while in an idle mode as recommendations may be frozen while in a connected state. In some cases, a service subscription switch may refer to the UE 115-a switching from a first service subscription associated with the SIM 220-a (e.g., a first SIM 220) to a second service subscription associated with the SIM 220-b (e.g., a second SIM 220).

However, the framework used by the UE 115-a may provide a SIM 220 switch recommendation based on the current conditions of the UE 115-a while refraining from considering the future route of the UE 115-a and the future network capabilities and conditions. In contrast, the techniques of the present disclosure describe a framework that recommends a service subscription or SIM 220 switch to the high-level operating system (HLOS) of the UE 115-a based on both the current and future route of the UE 115-a. Further, the recommendation may also be based on the network capabilities and conditions of the SIM 220-a and the SIM 220-b along a future route of the UE 115-a (e.g., a predicted route for the UE 115-a) while satisfying one or more conditions. In some cases, such conditions for the service subscription switching may include one or more service targets (e.g., throughput and latency targets of running one or more applications), a cost of the first service subscription associated with the SIM 220-a, a cost of the second service subscriptions associated with the SIM 220-b, or a quantity of SIM 220 switches.

Thus, the techniques of the present disclosure introduce a framework (e.g., a predictive best access framework) the enables the UE 115-a to determine a potential service subscription or SIM 220 switch recommendation at each respective zone 215 of a route based on one or more metrics (e.g., service subscription cost, network service targets, and the network capabilities and conditions) of a set of predicted future zones. For example, the UE 115-a may determine a service subscription or SIM 220 switch recommendation for a set of N−1 future zones 215. To determine the service subscription or SIM 220 switch recommendation the UE 115-a may utilize the SNR and network loading of each respective zone to determine an accurate estimate of a projected throughput for each respective zone. In some examples, such metrics may be either measured or predicted based on values from local or crowdsourced databases that store historical SNR and network loading values of respective zones. For example, the UE 115-a may predict the projected throughput of a respective zone 215 based on historic measurements of the respective zone and on the current network conditions.

Therefore, the UE 115-a may utilize the techniques of the present disclosure to maximize the utility (e.g., the throughput experience along a route irrespective of running applications) of the UE 115-a. In some examples, the UE 115-a may be capable of maximizing the utility of the UE 115-a with a constraint on a quantity of service subscription or SIM 220 switches. In some other examples, the UE 115-a may be capable of maximizing the utility of the UE 115-a while considering the cost of each respective service subscription or SIM 220 (e.g., the SIM 220-a and the SIM 220-b). Additionally, or alternatively, the UE 115-a may be capable of maximizing the utility of the UE 115-a while considering one or more network targets and the constraint on a quantity of service subscription or SIM 220 switches. Thus, the framework for service subscription or SIM 220 switching described herein may be a service subscription cost framework, may involve the network loading, may consider the network capabilities and conditions for future zones 215, or any combination thereof. Further, the network loading may be based on a delay between a grant request and an actual request where estimations for the network loading of future zones 215 may be available on the UE 115-a or available from one or more cloud servers. Further descriptions of the techniques of the present disclosure that describe the service subscription switching or SIM 220 switching framework that considers future zones 215 may be described elsewhere herein, such as with reference to FIGS. 3 and 4.

FIG. 3 shows an example of a flowchart 300 that supports subscriber identity module switching based on predicted utility in accordance with one or more aspects of the present disclosure. In some examples, the flowchart 300 may implement or be implemented by the wireless communications system 100, the wireless communications system 200, or both. The operations of the flowchart 300 may be implemented by a UE 115 or its components as described herein. For example, the operations of the flowchart 300 may be performed by a UE 115 as described with reference to FIGS. 1 and 2. In some examples, a UE 115 may execute a set of instructions to control the functional elements of the UE 115 to perform the described functions. Additionally, or alternatively, the UE 115 may perform aspects of the described functions using special-purpose hardware.

In some examples, the flowchart 300 may illustrate one or more instructions or steps of a framework that a UE 115 may use to determine whether a UE 115 should perform a SIM switch. In the following description of the flowchart 300, the operations may be performed in different orders or at different times. Some operations may also be left out of the flowchart 300, or other operations may be added. Although a UE 115 may perform the operations of the flowchart 300, some aspects of some operations may also be performed by one or more other wireless devices.

At 305, the UE 115 may calculate, for both an active SIM of the UE 115 and an inactive SIM of the UE 115, the configured throughput from an RRC configuration for a respective zone. The active SIM of the UE 115 may be associated with a connected service subscription (e.g., an active data service) of the SIM that the UE 115 is currently using. The inactive SIM of the UE 115 may be associated with an inactive service subscription (e.g., an idle data service) of a SIM that is inactive at the UE 115. Further, the configured throughput may be based on one or more metrics 310 of the respective cell. The one or more metrics 310 may include downlink/uplink bandwidths, a quantity of CCs, a quantity of MIMO layers, or any combination thereof.

At 315, the UE 115 may calculate, for both the active and inactive SIM of the UE 115, the projected throughput for the respective zone by applying the SNR scaling 320 and the estimated network loading 325 (e.g., NW loading) to the configured throughput. The predicted throughput may be per zone ID, time of day (e.g., peak versus non-peak), or both, for each respective service subscription. A peak time of day may be the time of day when users most actively use a mobile network (e.g., during the day). Thus, non-peak times may be when users less frequently use the mobile network (e.g., at night). Further, the UE 115 may calculate the predicted throughput ($T_{put}$ at 315 based on Equation 2 below to generate a predicted throughput value 330 for the active SIM and a predicted throughput value 335 for the inactive SIM.

$$\text{Predicted } T_{put} = \text{Configured } T_{put} * SNR \text{ Scaling} * NW \text{ loading} \quad (2)$$

Thus, at 340, the predicted throughput values (e.g., the predicted throughput value 330 for the active SIM and the predicted throughput value 335 for the inactive SIM) along with a cost of each SIM may be mapped to a utility function 345. In some examples, the data mapped to the utility function 345 may be assigned weights based on the age of the data. For example, the UE 115 may assign data that was just calculated a relatively high weight and assign data that was calculated prior to a threshold amount of time a relatively lower weight. Further, the utility function 345 may be defined by Equation 3 below.

$$U = \beta \log (1 + tx) \quad (3)$$

Therefore, at 350, the UE 115 may calculate the utility, for both the active and inactive SIM of the UE 115, over the current zone and the N−1 future predicted zones. Thus, the UE 115 may determine a utility 355 of the active SIM and the corresponding service subscription ($U^{conn.}$) and a utility 360 of the inactive SIM and the corresponding service subscription ($U^{idle}$). As such, at 365, based on an algorithm, the utility 360 of the inactive SIM of the UE 115 may be compared to the utility 355 of the active SIM of the UE 115 and a hysteresis value, as shown below in Equation 4. For example, the UE 115 may compare a first utility value of a first service subscription to a second utility value of a second service subscription.

$$U^{idle} \geq U^{conn.} + \text{hysteresis} \quad (4)$$

In some cases, the hysteresis value used at 365 may be based on the algorithm used by the UE 115 to determine whether the UE 115 should switch SIMs. Further, based on the comparison, at 370, the framework may recommend that the UE 115 perform a SIM switch if the utility 360 of the inactive SIM is greater than or equal to the utility 355 of the active SIM and the hysteresis value. Otherwise, at 375, the framework may recommend that the UE 115 refrain from switching SIMs as the active SIM is performing better than the inactive SIM.

Thus, at 380, the steps and operations in the flowchart 300 may be repeated for each zone along the route of the UE. Therefore, the algorithm may assist the UE 115 in selecting the most efficient service subscription and associated SIM for traveling along a route. For example, as described elsewhere herein, if the UE 115 is a vehicle UE 115, the UE 115 may travel along a route from a source location to a destination location where the route includes a set of one or more zones. The algorithm may then recommend the UE 115 to use which ever service subscription provides a higher utility over N consecutive zones to avoid unnecessary SIM switches. Further, the framework may align with one or more protocol systems of the UE 115 to estimate an achievable throughput using the network loading estimate.

Therefore, the steps and operations of the flowchart may describe the steps of the framework the UE 115 may use to determine whether to perform a SIM switch in a zone along a route of zones in accordance with the one or more aspects of the present disclosure. Further descriptions of the techniques of the present disclosure may be described elsewhere herein, such as with reference to FIG. 4. For example, FIG. 4 may illustrate a diagram of a route that a UE 115 may travel that describes how the UE 115 calculates the utility of the active and inactive SIM for each zone along the route, including the current zone, a subset of future zones, a subset of past zones, or any combination thereof.

FIG. 4 shows an example of a UE route diagram 400 that supports subscriber identity module switching based on predicted utility in accordance with one or more aspects of the present disclosure. In some examples, the UE route diagram 400 may implement or be implemented by the wireless communications system 100, the wireless communications system 200, or both. For example, the UE route diagram 400 may include a UE 115-*b* which may be an example of a device described herein with reference to FIG. 1. In some cases, the UE 115-*b* may also be an example dual SIM UE 115 that is configured with a SIM 410-*a* and a SIM 410-*b* as described with reference to FIG. 2.

As illustrated in the UE route diagram 400, the UE 115-*b* may travel along a route 405 that includes a set of zones 415 (e.g., a zone 415-*a*, a zone 415-*b*, a zone 415-*c*, a zone 415-*d*, a zone 415-*e*, a zone 415-*f*, and a zone 415-*g*). The large dark arrow to the right of the UE 115-*b* may illustrate that the UE 115-*b* is moving from zone 415 to zone 415 along the route 405. Further, the zone 415-*b* may be referred to as the current zone as the UE 115-*b* may currently be within the zone 415-*b*. Thus, the zone 415-*a* may be considered a past zone 415 and the zones 415-*c* through the zone 415-*g* may be considered the future zones 415. As such, the set of zones 415 may include at least a subset of zones 415 that the UE 115-*b* is predicted to travel in (e.g., the future zones 415).

In some examples, the zones 415 of the set of zones 415 of the UE route diagram 400 may be defined by a set of geographic coordinates that outline a border of the respective zones 415. For example, as illustrated in FIG. 4, each respective zone 415 may be defined as a 50-meter by 50-meter rectangle. Further, the UE 115-*b* may consider each zone for each SIM 410 (e.g., the SIM 410-*a* and the SIM 410-*a*) that is included within a database the UE 115-*b* maintains. For example, the UE 115-*b* may maintain a database of zones 415 that the UE 115-*b* has visited or frequently visits. Therefore, for each service subscription of each SIM 410, the UE 115 may create and update a database or heap map with up-to-date and current data that considers the zones 415, time of day, network loading, service subscription costs, or any combination thereof. The database or heatmap may also include zones 415 with high and low configured throughputs or projected throughputs, zones 415 that are out of service (OOS), zones 415 that suffer from repeated radio link failure (RLF), zones 415 that have repeated data stalls, or any combination thereof. Moreover, the UE 115-*b* may populate the database in an RRC connected state and the UE 115-*b* can use the database in the RRC connected or idle states to calculate the projected throughput of respective zones 415.

In some cases, the UE 115-*b* may also push a locally stored database (e.g., a database stored at the UE 115-*b*) to a cloud-based system to store the aggregated information on the zones 415. Thus, if the information for the zones 415 is unavailable locally at the UE 115-*b*, the UE 115-*b* may pull the information from the cloud-based system. Additionally, or alternatively, if the information for the zones 415 is unavailable both locally at the UE 115-*b* and within a cloud-based system, the UE 115-*b* may estimate the missing data and information using data handling techniques, machine learning (ML) models, artificial intelligence (AI) models, or any combination thereof.

Further, when determining whether to perform a SIM 410 switch, the UE 115-*b* may consider one or more metrics. In some examples, the one or more metrics may include a quantity of SIM 410 switches along the route 405, an average rate of service subscription or SIM 410 switching $$\left( e.g., \frac{\# \ SIM \ \text{switches}}{\# \ \text{zones in a route}} \right),$$

an average quantity of zones 415 or distance between SIM 410 switches $$\left( e.g., \frac{1}{Avg. \ \text{rate of} \ SIM \ \text{switches}} \right),$$

or any combination thereof. In some other examples, the one or more metrics may include an average utility or projected throughput over the entire route 405 with SIM 410 switches, an average utility or projected throughput over the entire route 405 on the first service subscription of the SIM 410-*a*, an average utility or projected throughput over the entire route 405 on the second service subscription of the SIM 410-*b*, or any combination thereof.

In some examples, the UE 115-*b* may use an algorithm from a set of algorithms to determine whether the UE 115-*b* should switch between SIMs 410. Each respective algorithm of the set of algorithms may differ based on the conditions being considered. For example, a first algorithm of the set of algorithms may refrain from considering any condition besides maximizing the utility for the active SIM throughout the route 405 of the UE 115-*b*. Thus, when using the first algorithm, the UE 115-*b* may switch the active SIM 410 of the UE 115-*b* from the SIM 410-*a* to the SIM 410-*b*, within a current zone 415 (e.g., the zone 415-*b*) if the utility of the SIM 410-*b* is greater than the combination of the utility of the SIM 410-*a* and a hysteresis value for the zone 415 and each future zone 415 (e.g., the zone 415-*c*, the zone 415-*d*, the zone 415-*e*, the zone 415-*f*, and the zone 415-*g*) of within the route 405.

Thus, while using the first algorithm, at a zone 415 i (e.g., the zone 415-*b*), the UE 115-*b* may calculate whether the UE 115-*b* should switch from the SIM 410-*a* associated with a first service subscription to the SIM 410-*b* associated with a second service subscription. To calculate such determination, the UE 115-*b* evaluate a first utility value for the SIM 410-*a* that is associated with the first service subscription and a second utility value for the SIM 410-*b* that is associated with the second service subscription. The first utility value and the second utility value may be based on a measured throughput level, SNR level, and network load of each respective SIM 410 and respective service subscription within the zone 415-*b*. Since the zone 415-*b* includes the UE 115-*b*, the UE 115-*b* may be capable of performing measurements to determine the SNR and network loading values of the zone 415-*b*. In some cases, the utility value may be a normalized value of the measured throughput level, SNR level, and network load that is between the values of 0 and 1.

The UE 115-*b* may then compare the first utility value of the first service subscription to the second utility value of the second service subscription using Equation 4 for the zone 415-*b*. Based on such comparison, the UE 115-*b* may determine a service subscription switch condition for the zone 415-*b*. For example, if the UE 115-*b* determines that the utility of the SIM 410-*b* is greater than the combination of the utility of the SIM 410-*a* and a hysteresis value in the zone 415-*b*, the UE 115-*b* may determine a service subscription switch condition for the zone 415-*b* that indicates that the UE 115-*b* should switch from the SIM 410-*b* to the SIM 410-*a*. In some cases, the service subscription switch condition may be a binary value where a value of 1 indicates that the UE 115-*b* should perform a SIM 410 switch and a value of 0 indicates that the UE 115-*b* should refrain from performing the SIM 410 switch.

The UE 115-*b* may then compare the first utility value of the first service subscription to the second utility value of the second service subscription using Equation 4 for each future zone 415 (e.g., zones i+1, . . . , i+N−1) to determine a service subscription switch condition for each respective future zone 415. The utility values for the future zones 415 may be based on SNR and network loading values from a databased of historical SNR and network loading values for the respective zones.

Once the UE 115-*b* determines a service subscription switch condition for each zone 415 of the set of zones 415, the UE 115 may determine whether to switch from the active SIM 410 (e.g., the SIM 410-*a*) to the inactive SIM (e.g., the SIM 410-*b*) based on a function of the service subscription conditions. For example, if the service subscription switch condition for each zone 415 of the set of zones indicates that the UE 115-*b* should perform a SIM 410 switch, the UE 115-*b* may switch from the first service subscription associated with the SIM 410-*a* to second service subscription associated with the SIM 410-*b*. However, if a single service subscription switch condition of a respective zone 415 indicated that the UE 115-*b* should refrain from switching service subscriptions or SIMs 410, the UE 115-*b* will refrain from doing so. For example, if the UE 115-*b* determines that the service subscription of the zone 415-*d* is equal to 0 and indicates to refrain from switching service subscriptions or SIMs 410 then the utility of the UE 115-*b* may not be maximized across the entire route 405. Thus, the UE 115-*b* may refrain from switching service subscriptions or SIMs 410 unless the service subscription switch condition of each zone 415 indicated for the UE 115-*b* to perform a service subscription or SIM 410 switch.

In some examples, the UE 115-*b* may instead use a second algorithm to determine whether the UE 115-*b* should switch between service subscriptions or SIMs 410. The second algorithm is similar to the first algorithm, but the second algorithm may further consider a quantity of service subscription switches over the past M zones. Thus, the utility maximization over the route 405 may be based on a quantity of service subscription switches over the past M zones 415, where the past M zones 415 includes the zone 415-*a*. For example, when the UE 115-*b* switches service subscriptions, the UE 115-*b* may experience a brief service interruption. However, as the quantity of service subscriptions increases, the UE 115-*b* may experience more service interruptions which may impact the effectiveness and reliability of the UE 115-*b*. As such, if the quantity of service subscription switches over the past M zones 415 is above a threshold quantity of service subscription switches, the UE 115-*b* may increase the value of the hysteresis used in Equation 4, the quantity of future zones 415 N, or both.

For example, if the UE 115-*b* increases the hysteresis value then the likelihood of switching SIMs may decrease as the combination of the first utility value of the first service subscription associated with the SIM 410-*a* may be greater. Moreover, if the UE 115-*b* increases the quantity of future zones 415 N, the UE 115-*b* may have a decreased probability that the service subscription switch condition of each zone 415 of the set of zones 415 indicates for the UE 115-*b* to switch service subscriptions. Thus, if the quantity of service subscription switches over the past M zones 415 is above the threshold quantity of service subscription switches, the UE 115-*b* may have in increase in probability of remaining on the currently active service subscription and the corresponding SIM (e.g., the SIM 410-*a*).

In some other examples, the UE 115-*b* may use a third algorithm that uses the cost of a respective SIM 410. For example, the first service subscription associated with the SIM 410-*a* may correspond to a first service subscription cost and the second service subscription associated with the SIM 410-*b* may correspond to a second service subscription cost. The cost of a service subscription of a respective SIM 410 may refer to the data cost for the service subscription. For example, the SIM 410-*a* may have a cost of $5.00 per gigabyte (GB) and the SIM 410-*b* may have a cost of $10.00 per GB. As such, the UE 115-*b* may determine the service subscription switch condition for each respective zone 415 of the set of zones 415 based on a hysteresis value that is based on a service subscription cost of a respective service subscription of a respective SIM 410 that is active at the UE 115-*b*. Thus, while the UE 115-*b* may consider the performance of the respective SIMs 410, the UE 115-*b* may also consider the cost of the currently active SIM 410 to determine the service subscription switch condition of a respective zone 415.

For example, when the first service subscription cost of the service subscription of the SIM 410-*a* is different from the second service subscription cost of the service subscription of the SIM 410-*b*, the UE 115-*b* may use Equation 5 below to determine a hysteresis value for determining the service subscription switch condition. Thus, the UE 115-*b* may use a hysteresis value that is based on whether the cost of the active SIM 410 is higher than the cost of the inactive SIM 410, or vice versa. Further, the UE 115-*b* may determine such hysteresis values based on fine-tuning the hysteresis values such that the UE 115-*b* considers the subscription service costs.

$$hyst^{(HC)} < hyst < hyst^{(LC)} \qquad (5)$$

For example, as shown in Equation 5, if the active SIM 410 of the UE 115-*b* is a higher cost than the cost of the inactive SIM 410 of the UE 115-*b*, the UE 115-*b* may use the $hyst^{(HC)}$ value which has a bias against the higher cost subscription service. As such, the UE 115-*b* may determine the service subscription switch condition based on Equation 6 below which makes the service subsection switch condition more likely to indicate a service subscription switch to the lower cost service subscription.

$$U_{idle}^{(LC)} > U_{conn.}^{(HC)} + hyst^{(HC)} \qquad (6)$$

Further, if the active SIM 410 of the UE 115-*b* is a lower cost than the cost of the inactive SIM 410 of the UE 115-*b*, the UE 115-*b* may use the $hyst^{(LC)}$ value that makes switching to the higher cost service subscription more difficult. As such, the UE 115-*b* may determine the service subscription switch condition based on Equation 7 below which makes the subscription condition more stringent thus making the UE 115-*b* more likely to stay on the lower cost service subscription. Therefore, the UE 115-*b* may be capable of considering the cost of the respective service subscriptions of the SIM 410-*a* and the SIM 410-*b* when determining whether to switch between the SIM 410-*a* and the SIM 410-*b*.

$$U_{idle}^{(HC)} > U_{conn.}^{(LC)} + hyst^{(LC)} \qquad (6)$$

In a different example, the UE 115-*b* may use a fourth algorithm that takes one or more network target conditions into consideration. When using the fourth algorithm, the UE 115-*b* may attempt to reduce the quantity of service subscription switches as long as a respective service subscription satisfies a utility value threshold that is based on a minimum service (e.g., network service) target (e.g., $U_0$). For example, since the performance of a service subscription switch may result in one or more service interruptions for the UE 115-*b*, the UE 115-*b* may have a degraded user experience. Therefore, the realized average utility over the route 405 may be lower if the UE 115-*b* uses the first algorithm.

Thus, the UE 115-*b* may select a different hysteresis value based on the utility value threshold. For example, the UE 115-*b* may determine to use a first hysteresis value (e.g., hyst) or a second hysteresis value (e.g., hyst$_+$) that is greater than the first hysteresis value (e.g., hyst<hyst$_+$). Further, when the UE 115-*b* uses the second hysteresis value, the subscription service may be relatively to indicate a service subscription switch. For example, if the utility of both a first utility value (e.g., a utility value of the SIM 410-*a* associated with a first service subscription) and a second utility value (e.g., a utility value of the SIM 410-*b* associated with a second service subscription) fail to satisfy (e.g., are below) the utility value (e.g., $U_{conn.}$<$U_0$ and $U_{idle}$<$U_0$), the UE 115-*b* may use Equation 7 to determine the service subscription switch condition that uses the second hysteresis value thus making a switch less likely to be indicated.

$$U_{idle} > U_{conn.} + hyst_+ \qquad (7)$$

Therefore, if the utility of the second utility value associated with the inactive SIM 410-*b* is greater than the utility of the first utility value associated with the active SIM 410-*a* and the second hysteresis value, the service subscription switch condition may be equal to 1 that indicates for the UE 115-*b* to perform a service subscription switch. Moreover, the UE 115-*b* may use the second hysteresis value such that the UE 115-*b* may avoid performing unnecessary service subscription switches. Further, if the utility of the first utility value associated with the active SIM 410-*a* fails to satisfy the utility threshold (e.g., $U_{conn.}$<$U_0$) and the utility of the second utility value associated with the inactive SIM 410-*b* satisfies (e.g., is greater than or equal to) the utility threshold (e.g., $U_{idle}$≥$U_0$), the UE 115-*b* may use the first hysteresis value in accordance with Equation 8.

$$U_{idle} > U_{conn.} + hyst \qquad (8)$$

Thus, the service subscription switch condition may be based on the standard hysteresis value that refrains from favoring the UE 115-*b* performing or refraining from performing a service subscription switch. Moreover, if the utility of both the first and second utility value associated with the SIM 410-*a* and the SIM 410-*b* respectively satisfy the utility value threshold (e.g., $U_{conn.}$≥$U_0$ and $U_{idle}$≥$U_0$), the service subscription switch condition may be equal to 0 to indicate that the UE 115-*b* should refrain from performing a service subscription switch. Therefore, the UE 115-*b* may be capable of reducing the quantity of service subscription switches based on whether a respective service subscription satisfies the utility value threshold to further improve the service of the UE 115-*b*.

In some other examples, the UE 115-*b* may use a fifth algorithm that includes the UE 115-*b* using the utility value threshold and the cost of the respective service subscriptions to determine the service subscription switch condition. Thus, the UE 115-*b* may be capable of reducing the quantity of service subscription switches as long as a respective service subscription satisfies the utility value threshold while also considering the cost of the respective service subscriptions. Moreover, the UE 115-*b* may prioritize the criteria such that the priority of the quantity of service subscription switches is greater than the priority of the utility value threshold being satisfied which is greater than the priority of the cost of a respective service subscription.

For example, the first service subscription associated with the SIM 410-*a* may be associated with a first service subscription cost and the second service subscription of the SIM 410-*b* may be associated with a second service subscription cost. Moreover, in some cases, the second service subscription cost may be lower than the first service subscription cost. Thus, the cost of the first service subscription associated with the active SIM 410 (e.g., the SIM 410-*a*) may be higher than the cost of the second service subscription associated with the inactive SIM 410 (e.g., the SIM 410-*b*). Therefore, in accordance with Equation 9 below, the UE 115-*b* may use the second hysteresis value (e.g., hyst$_+$) if the utility of the first and second utility value fail to satisfy the utility value threshold. Further, in accordance with Equation 10 below, the UE 115-*b* may use a high-cost hysteresis value (e.g., hyst (HC)) if the utility of the second utility value associated with the SIM 410-*b* satisfies the utility value threshold. Moreover, the high-cost hysteresis value may be less than the second hysteresis value (e.g., $hyst^{(HC)} < hyst_+$) to enable the UE 115-*b* to more easily determine to switch from the high-cost service subscription to the low-cost service subscription.

$$U_{idle}^{(LC)} > U_{conn.}^{(HC)} + hyst_+ \quad (9)$$

$$U_{idle}^{(LC)} > U_{conn.}^{(HC)} + hyst^{(HC)} \quad (10)$$

Therefore, the UE 115-*b* may determine the service subscription switch condition in accordance with Equation 9 where the hysteresis value may decrease the likelihood of the service subscription switch condition indicating for the UE 115-*b* to perform a service subscription switch. Moreover, when the UE 115-*b* uses Equation 10 to determine the service subscription switch condition, the service subscription switch condition may be more likely to indicate that the UE 115-*b* should perform a service subscription switch. Additionally, or alternatively, if the second utility value associated with a low-cost service subscription (e.g., the second subscription associated with the SIM 410-*b*) fails to satisfy the utility value threshold and the first utility associated with a high-cost service subscription (e.g., the first service subscription associated with the SIM 410-*a*) satisfies the utility value threshold, the UE 115-*b* may indicate for the UE 115-*b* to not perform a service subscription switch (e.g., the service subscription switch condition indicates a value of 0).

In some other examples, the first service subscription associated with the SIM 410-*a* (e.g., the active SIM 410) may be associated with a lower cost compared to the cost of the second service subscription associated the SIM 410-*b*. Therefore, the UE 115-*b* may determine the service subscription switch condition in accordance with Equations 11 and 12.

$$U_{idle}^{(HC)} > U_{conn.}^{(LC)} + hyst_+ \quad (11)$$

$$U_{idle}^{(HC)} > U_{conn.}^{(LC)} + hyst \quad (12)$$

For example, as shown in Equation 11, the UE 115-*b* may use a low-cost hysteresis value (e.g., $hyst^{(LC)}$), which may be equivalent to the second hysteresis value (e.g., $hyst^{(LC)} \cong hyst_+$) if both the first and second utility value associated with the first and second service subscription of the SIM 410-*a* and the SIM 410-*b* respectively fail to satisfy the utility value threshold. Further, as shown in Equation 12, the UE 115-*b* may use the first hysteresis value (e.g., hyst) if the second utility value satisfies the utility value threshold and the first utility value fails to satisfy the utility value threshold. Additionally, or alternatively, both the first and second utility value may satisfy the utility value threshold. Therefore, the service subscription switch condition may indicate for the UE 115-*b* to refrain from performing a service subscription switch and to remain on the first service subscription associated with the SIM 410-*a* that is associated with a lower cost than the second service subscription associated with the SIM 410-*b*.

Therefore, the UE 115-*b* may use the algorithms described herein to more accurately determine whether to perform a service subscription switch at the UE 115-*b* within a respective zone. Further, such determination may be based on the projected throughput of the first service subscription of the SIM 410-*a* and the second service subscription of the SIM 410-*b*. In some examples, as described elsewhere herein, the projected throughput of a respective service subscription may be based on a configured throughput for the respective service subscription in a respective zone 415, the network loading of the respective zone 415, the SNR scaling of the respective zone 415, or any combination thereof. Further, for a current zone 415 (e.g., the zone 415-*b*) the UE 115-*b* may estimate the network loading for the active service subscription of the active SIM 410 (e.g., the first service subscription of the SIM 410-*a*). Moreover, the UE 115-*b* may acquire the network loading for the inactive service subscription of the inactive SIM 410 (e.g., the second service subscription of the SIM 410-*b*) from a database. In addition, the UE 115-*b* may measure the SNR scaling factors for both the active service subscription of the SIM 410-*a* and the inactive service subscription of the SIM 410-*b*. Moreover, for future zones 415 (e.g., zone 415-*c*, zone 415-*d*, zone 415-*e*, zone 415-*f*, and zone 415-*g*), the UE 115-*b* may acquire the network loading and SNR scaling factors for the first and second service subscriptions from the database.

In some examples, the projected throughput for the first service subscription of the SIM 410-*a* (e.g., the active service subscription of the active SIM 410) may be set to a minimum of the configured throughput, the network loading, the SNR scaling, and a rate estimation obtained by the UE 115-*b* in the connected mode of the UE 115-*b*. Moreover, in some cases, the projected throughput for the second service subscription of the SIM 410-*b* (e.g., the inactive service subscription of the inactive SIM 410) may be a function of the configured throughput, the network loading, and the SNR scaling, as described elsewhere herein. In some other cases, the projected throughput for the second service subscription of the SIM 410-*b* may also be the minimum of the configured throughput, the network loading, the SNR scaling, and the rate estimation. However, in such case, the UE 115-*b* may use the network loading value that is the maximum of the network load value stored in the database for the second service subscription and the current network load of the first service subscription that connected and active at the UE 115-*b*.

Further, in each algorithm described herein, the weight of the service subscription switch condition may be equal for each zone 415 of the route 405. However, in some cases, the UE 115-*b* may assign a higher weight to the current zone 415-*b* since the UE 115-*b* may be capable of more accurately estimating the projected throughput of the current zone 415-*b*. For example, the UE 115-*b* may estimate the projected throughput of the current zone 415-*b* via measured, estimated, or both SNR scaling factors, network loading values, or the UE 115-*b* using one or more rate estimation algorithms. Additionally, or alternatively, the UE 115-*b* may use the same weight for each other future zone 415 past the zone 415-*b*.

However, in some cases, the UE 115-*b* may assign higher weights to some future zones 415. For example, if the UE 115-*b* calculates the projected throughput of the zone 415-*c* via data from a local database and the projected throughput of the zone 415-*d* via data from a crowdsourced database, the UE 115-*b* may assign the zone 415-*c* a higher weight as the local database may be relatively more reliable than the crowdsourced database. Additionally, or alternatively, the UE 115-b may consider the age of the database values when assigning a weight to a service subscription switch consideration. For example, a database value that is a week old may contribute to a lower weight than a database value that is an hour old. Therefore, in accordance with Equation 13 below, the UE 115-b may calculate a 'soft-switching metric' (e.g., a service subscription switching metric) for a respective zone 415, i, using a series of N−1 coefficients (e.g., ($a_2$, $a_3$, . . . , $a_N$)). Equation 13 may be equal to the service subscription switching metric of the respective zone 415 that is a sum of the coefficients from a value j to i+N−1 multiplied by a comparison of the second utility value of the SIM 410-b and the first utility value of the SIM 410-a, to determine a service subscription switch condition for a respective zone 415, i.

$$\sum\nolimits_{j=i+1}^{i+N-1} a_{j-i+1} * 1\{U_{idle}(\text{zone}_j) > U_{conn.}(\text{zone}_j) + hyst\} \qquad (13)$$

Thus, in accordance with Equation 13, the UE 115-b may check two conditions to determine the service subscription switch condition of a respective zone 415 (e.g., the current zone 415-b). The first condition may include the UE 115-b determining if the second utility value associated with the SIM 410-b (e.g., the inactive SIM 410) at the respective zone 415, i, is greater than the first utility value associated with the SIM 410-a (e.g., the active SIM 410) and a hysteresis value (e.g., $U_{idle}(\text{zone}_i) > U_{conn.}(\text{zone}_i) + hyst$). Further, the first utility value and the second utility values may be for the current zone 415-b of the UE 115-b. The second condition may include the UE 115-b determining if the service subscription switching metric (e.g., soft switching $metric_i$) is greater than a service subscription metric threshold (e.g., soft switching $metric_i > Thr_{soft\ metric}$). Therefore, the framework of the present disclosure may enable the UE 115-b to recommend a service subscription switch for the current zone 415-b based on the first and second conditions where the service subscription metric threshold is between two values $$\left(\text{e.g., } \frac{1}{2} < Thr_{softmetric} \le 1\right).$$

Additionally, or alternatively, in some cases, the quantity of future zones 415 (e.g., N−1) used by the algorithms described herein may be a fixed predetermined quantity. In some other cases, the UE 115-b may adjust the value of N based on the local geometry (e.g., the location) and speed of the UE 115-b. For example, if the UE 115-b is a vehicle UE 115 that is moving at a relatively high speed (e.g., highway speeds), the UE 115-b may adjust the value of N to be larger accordingly. Therefore, the UE 115-b may adjust the quantity of future zones 415 that a service subscription switch condition is determined for based on a speed or mobility level of the UE 115-b (e.g., an average speed or mobility level) over the past M zones 415. For example, as shown below in Equation 14, the UE 115-b may determine the quantity of future zones 415 used based on whether the average speed of the UE 115-b satisfies a threshold over the past M zones 415 or the past d distance (e.g., distance in miles or kilometers).

$$\#\text{future zones} = \begin{cases} N_{high} - 1, & avg.\ \text{speed} \ge Thr_H \\ N - 1, & Thr_L \le avg.\ \text{speed} < Thr_H \\ N_{low}, & avg.\ \text{speed} < Thr_L \end{cases} \qquad (13)$$

Thus, in some examples, the UE 115-b may determine to use a first quantity of future zones 415 (e.g., $N_{high}$−1) if the average speed of the UE 115-b satisfies a high threshold value (e.g., $Thr_H$). In some other examples, the UE 115-b to use a second quantity of future zones 415 (e.g., N−1) if the average speed of the UE 115-b satisfies a low threshold value (e.g., $Thr_L$) but fails to satisfy the high threshold value. In addition, the UE 115-b may determine to use a third quantity of future zones 415 (e.g., $N_{low}$) if the average speed of the UE 115-b fails to satisfy the low threshold value. Further, it should be understood that the first quantity of future zones 415 may be higher than the second quantity of future zones 415 that is higher than the third quantity of future zones 415 (e.g., $N_{low} < N < N_{high}$). Additionally, or alternatively, the UE 115-b may default to the second quantity of future zones 415.

Therefore, as described herein, the techniques of the present disclosure may provide the UE 115-b with a predictive service subscription recommendation framework. In accordance with the techniques of the present disclosure, the UE 115-b may use the framework to simultaneously consider the networks key performance indicators (e.g., network load, chancel condition) along a predicted future route 405 along with one or more user-imposed targets (e.g., minimum network service targets, a maximum quantity of service subscription switches). Thus, the UE 115-b may use the framework described herein to improve communications with a wireless communications system by ensuring the UE 115-b switches between service subscriptions of SIMs 410 within a reliable and efficient manner. Further descriptions of the techniques of the present disclosure may be described elsewhere herein, such as with reference to FIG. 5.

FIG. 5 shows an example of a process flow 500 that supports subscriber identity module switching based on predicted utility in accordance with one or more aspects of the present disclosure. In some examples, the process flow 500 may implement or be implemented by the wireless communications system 100. For example, the process flow 500 may include a UE 115-c, a network entity 105-c, and a network entity 105-d, which may be examples of devices described herein with reference to FIG. 1. Further, the UE 115-c may be a dual SIM UE 115 and that is configured with a first SIM and a second SIM for wireless communications. In addition, the first SIM may subscribe to the service provided by the network entity 105-c via a first service subscription and the second SIM may subscribe to the service provided by the network entity 105-d via a second service subscription.

In the following description of the process flow 500, the operations between the UE 115-c, the network entity 105-c, and the network entity 105-d may be performed in different orders or at different times. Some operations may also be left out of the process flow 500, or other operations may be added. Although the UE 115-c, the network entity 105-c, and the network entity 105-d are shown performing the operations of the process flow 500, some aspects of some operations may also be performed by one or more other wireless devices.

At 505, the UE 115-c may evaluate, for each respective zone of a set of zones along a route of the UE 115-c, a first utility value for a first SIM of the UE 115-c associated with a first service subscription and a second utility value for a second SIM of the UE 115-*c* associated with a second service subscription. The first utility value may be based on a throughput level and a network load associated with the first service subscription for each respective zone and the second utility value may be based on a throughput level and a network load associated with the second service subscription for each respective zone. Further, the set of zones may include at least a first subset of zones through which the UE 115-*c* is predicted to travel. In some cases, the UE 115-*c* may include one or more processors that are coupled with one or more memories of the UE 115-*c* to evaluate the first utility value and the second utility value. Further, the one or more processors may be examples of one or more central processing units (CPUs) that can be used individually or collectively. Moreover, the one or more memories may be examples of one or more random access memory (RAM) components that can be used individually or collectively.

In some examples, the UE 115-*c* may also evaluate, for each respective zone of the set of zones, a first service subscription cost for the first service subscription associated with the first SIM and a second service subscription cost for the second service subscription associated with the second SIM. Further, a quantity of zones in the first subset of zones of the set of zones may be based on a speed of movement of the UE 115-*c*. Moreover, each respective zone of the set of zones may be based on respective sets of geographic coordinates for each respective zone to the set of zones.

At 510, the UE 115-*c* may compare, for each respective zone of the set of zones, the first utility value of the first service subscription to the second utility value of the second service subscription to determine a service subscription switch condition for each respective zone. Further, in some cases, the UE 115-*c* may use the one or more processors of the UE 115-*c* that are coupled with one or more memories of the UE 115-*c* to compare the first utility value to the second utility value. In some examples, the UE 115-*c* may calculate, for each zone of the set of zones, a hysteresis value to be used to determine the service subscription switch condition for each zone of the set of zones. In some cases, the service subscription switch condition, for each respective zone of the set of zones, may be determined based on a hysteresis value that is based on a service subscription cost of a respective service subscription of a respective SIM that is active at the UE 115-*c*.

Further, the UE 115-*c* may compare, for each respective zone of the set of zones, both the first utility value of the first service subscription that is associated with the first service subscription cost and the second utility value of the second service subscription that is associated with the second service subscription cost to a utility value cost. Moreover, the second service subscription cost may be different (e.g., higher or lower) from the first subscription cost. Thus, in some examples, a hysteresis value to be used to determine the service subscription switch condition for each zone of the set of zones may be based on the first utility value, the second utility value, or both satisfying the utility value threshold and on a service subscription cost of the respective service subscription of the respective SIM that is active at the UE 115-*c*.

In some cases, the UE 115-*c* may calculate one or more metrics that include a quantity of service subscription switches over the route, an average rate of service subscription switches, an average quantity of zones between service subscription switches, an average utility of the route with one or more service subscription switches, an average utility of the route for the first service subscription, an average utility of the route for the second service subscription, or any combination thereof. Further, in some cases, the service subscription switch condition for a respective zone may be based on the one or metrics. In some examples, the UE 115-*c* may calculate a hysteresis value may be used to determine the service subscription switch condition for each zone of the set of zones, a quantity of zones in the first subset of zones, or both. Further, the hysteresis value may be based on a quantity of service subscription switches performed before the first zone of the set of zones satisfying a threshold quantity of service subscription switches.

Further, in some other examples, the UE 115-*c* may compare, for each respective zone of the set of zones, the first utility value of the first service subscription to the second utility value of the second service subscription to a utility value threshold. Thus, the UE 115-*c* may use a hysteresis value to determine the service subscription switch condition based on the first utility value, the second utility value, or both satisfying the utility value threshold. Additionally, or alternatively, the UE 115-*c* may assign, for each respective zone of the set of zones, a respective weight to the service subscription switch condition for each respective zone. Thus, the UE 115-*c* may calculate, for each respective zone of the set of zones, a service subscription switch metric. The service subscription switch metric may be based on the respective weight assigned to each respective service subscriptions switch condition for each respective zone and on each respective service subscription switch condition for each respective zone.

At 515, the UE 115-*c* may switch, within a first zone of the set zones, between the first SIM of the UE 115-*c* that is serviced by the network entity 105-*c* and the second SIM of the UE 115-*c* that is serviced by the network entity 105-*d*. The switching may be based on a function of the service subscription switch conditions for the set of zones. Further, the first zone may be a zone that includes the UE 115-*c* (e.g., a zone that the UE 115-*c* is currently within). In some examples, the switching between the first SIM of the UE 115-*c* and the second SIM of the UE 115-*c* in the first zone may be based on the service subscription switch metric for the first zone satisfying a service subscription switch metric threshold. Further, in some cases, switching between the first SIM of the UE 115-*c* and the second SIM of the UE 115-*c* may be based on the function of the service subscription switch conditions for each respective zone indicating for the UE 115-*c* to switch between the first SIM of the UE 115-*c* and the second SIM of the UE 115-*c*. Moreover, in some examples, the UE 115-*c* may use the one or more processors of the UE 115-*c* that are coupled with the one or more memories of the UE 115-*c* to perform the switching between the first SIM and the second SIM. Additionally, or alternatively, the UE 115-*c* may perform a handover procedure to switch between the first SIM and the second SIM to ensure that the UE 115-*c* has limited service interruptions.

FIG. 6 shows a block diagram 600 of a device 605 that supports subscriber identity module switching based on predicted utility in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to subscriber identity module switching based on predicted utility). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to subscriber identity module switching based on predicted utility). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of subscriber identity module switching based on predicted utility as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a CPU, an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for evaluating, for each respective zone of a set of multiple zones along a route of the UE, a first utility value for a first SIM of the UE associated with a first service subscription and a second utility value for a second SIM of the UE associated with a second service subscription, the first utility value being based on a throughput level and a network load associated with the first service subscription for the each respective zone and the second utility value being based on a throughput level and a network load associated with the second service subscription for the each respective zone, where the set of multiple zones includes at least a first subset of zones through which the UE is predicted to travel. The communications manager 620 is capable of, configured to, or operable to support a means for comparing, for each respective zone of the set of multiple zones, the first utility value of the first service subscription to the second utility value of the second service subscription to determine a service subscription switch condition for each respective zone. The communications manager 620 is capable of, configured to, or operable to support a means for switching, within a first zone of the set of multiple zones, between the first SIM of the UE and the second SIM of the UE based at least in part on a function of the service subscription switch conditions for the set of multiple zones, the first zone including the UE.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for a UE to dynamically switch between SIMs along a route to support reduced processing, reduced power consumption, and a more efficient utilization of communication resources.

FIG. 7 shows a block diagram 700 of a device 705 that supports subscriber identity module switching based on predicted utility in accordance with one or more aspects of the present disclosure. The device 705 may be an example of aspects of a device 605 or a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to subscriber identity module switching based on predicted utility). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to subscriber identity module switching based on predicted utility). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of subscriber identity module switching based on predicted utility as described herein. For example, the communications manager 720 may include a utility value evaluation component 725, a utility value comparison component 730, an SIM switching component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The utility value evaluation component 725 is capable of, configured to, or operable to support a means for evaluating, for each respective zone of a set of multiple zones along a route of the UE, a first utility value for a first SIM of the UE associated with a first service subscription and a second utility value for a second SIM of the UE associated with a second service subscription, the first utility value being based on a throughput level and a network load associated with the first service subscription for the each respective zone and the second utility value being based on a throughput level and a network load associated with the second service subscription for the each respective zone, where the set of multiple zones includes at least a first subset of zones through which the UE is predicted to travel. The utility value comparison component 730 is capable of, configured to, or operable to support a means for comparing, for each respective zone of the set of multiple zones, the first utility value of the first service subscription to the second utility value of the second service subscription to determine a service subscription switch condition for each respective zone. The SIM switching component 735 is capable of, configured to, or operable to support a means for switching, within a first zone of the set of multiple zones, between the first SIM of the UE and the second SIM of the UE based on a function of the service subscription switch conditions for the set of multiple zones, the first zone including the UE.

FIG. 8 shows a block diagram 800 of a communications manager 820 that supports subscriber identity module switching based on predicted utility in accordance with one or more aspects of the present disclosure. The communications manager 820 may be an example of aspects of a communications manager 620, a communications manager 720, or both, as described herein. The communications manager 820, or various components thereof, may be an example of means for performing various aspects of subscriber identity module switching based on predicted utility as described herein. For example, the communications manager 820 may include a utility value evaluation component 825, a utility value comparison component 830, an SIM switching component 835, a hysteresis value calculation component 840, a service subscription cost evaluation component 845, a service subscription weight assignment component 850, a service subscription switch metric calculation component 855, or any combination thereof. Each of these components, or components or subcomponents thereof (e.g., one or more processors, one or more memories), may communicate, directly or indirectly, with one another (e.g., via one or more buses).

The communications manager 820 may support wireless communications in accordance with examples as disclosed herein. The utility value evaluation component 825 is capable of, configured to, or operable to support a means for evaluating, for each respective zone of a set of multiple zones along a route of the UE, a first utility value for a first SIM of the UE associated with a first service subscription and a second utility value for a second SIM of the UE associated with a second service subscription, the first utility value being based on a throughput level and a network load associated with the first service subscription for the each respective zone and the second utility value being based on a throughput level and a network load associated with the second service subscription for the each respective zone, where the set of multiple zones includes at least a first subset of zones through which the UE is predicted to travel. The utility value comparison component 830 is capable of, configured to, or operable to support a means for comparing, for each respective zone of the set of multiple zones, the first utility value of the first service subscription to the second utility value of the second service subscription to determine a service subscription switch condition for each respective zone. The SIM switching component 835 is capable of, configured to, or operable to support a means for switching, within a first zone of the set of multiple zones, between the first SIM of the UE and the second SIM of the UE based on a function of the service subscription switch conditions for the set of multiple zones, the first zone including the UE.

In some examples, the hysteresis value calculation component 840 is capable of, configured to, or operable to support a means for calculating, for each zone of the set of multiple zones, a hysteresis value to be used to determine the service subscription switch condition for each zone of the set of multiple zones.

In some examples, the service subscription cost evaluation component 845 is capable of, configured to, or operable to support a means for evaluating, for each respective zone of the set of multiple zones, a first service subscription cost for the first service subscription associated with the first SIM and a second service subscription cost for the second service subscription associated with the second SIM.

In some examples, the service subscription switch condition, for each respective zone of the set of multiple zones, is determined based on a hysteresis value that is based at least in part on a service subscription cost of a respective service subscription of a respective SIM that is active at the UE.

In some examples, the utility value comparison component 830 is capable of, configured to, or operable to support a means for comparing, for each respective zone of the set of multiple zones, both the first utility value of the first service subscription that is associated with the first service subscription cost and the second utility value of the second service subscription that is associated with the second service subscription cost to a utility value threshold, the second service subscription cost being different from the first service subscription cost, where a hysteresis value to be used to determine the service subscription switch condition for each zone of the set of multiple zones is based on the first utility value, the second utility value, or both satisfying the utility value threshold and on a service subscription cost of a respective service subscription of a respective SIM that is active at the UE.

In some examples, to support comparing the first utility value to the second utility value, the utility value comparison component 830 is capable of, configured to, or operable to support a means for calculating one or more metrics including a quantity of service subscription switches over the route, an average rate of service subscription switches, an average quantity of zones between service subscription switches, an average utility of the route with one or more service subscription switches, an average utility of the route for the first service subscription, an average utility of the route for the second service subscription, or any combination thereof, where the service subscription switch condition is based on the one or more metrics.

In some examples, the hysteresis value calculation component 840 is capable of, configured to, or operable to support a means for calculating a hysteresis value to be used to determine the service subscription switch condition for each zone of the set of multiple zones, a quantity of zones in the first subset of zones, or both, based on a quantity of service subscription switches performed before the first zone of the set of multiple zones satisfying a threshold quantity of service subscription switches.

In some examples, the utility value comparison component 830 is capable of, configured to, or operable to support a means for comparing, for each respective zone of the set of multiple zones, the first utility value of the first service subscription and the second utility value of the second service subscription to a utility value threshold, where a hysteresis value to be used to determine the service subscription switch condition for each zone of the set of multiple zones is based on the first utility value, the second utility value, or both satisfying the utility value threshold.

In some examples, the service subscription weight assignment component 850 is capable of, configured to, or operable to support a means for assigning, for each respective zone of the set of multiple zones, a respective weight to the service subscription switch condition for each respective zone. In some examples, the service subscription switch metric calculation component 855 is capable of, configured to, or operable to support a means for calculating, for each respective zone of the set of multiple zones, a service subscription switch metric that is based on the respective weight assigned to each respective service subscription switch condition for each respective zone and each respective service subscription switch condition for each respective zone, where switching between the first SIM of the UE and the second SIM of the UE in the first zone is based on the service subscription switch metric for the first zone satisfying a service subscription switch metric threshold.

In some examples, a quantity of zones in the first subset of zones of the set of multiple zones is based on a speed of movement of the UE.

In some examples, switching between the first SIM of the UE and the second SIM of the UE is based on the function of the service subscription switch condition for each respective zone indicating for the UE to switch between the first SIM of the UE and the second SIM of the UE.

In some examples, each respective zone of the set of multiple zones is based on respective sets of geographic coordinates for each respective zone of the set of multiple zones.

FIG. 9 shows a diagram of a system 900 including a device 905 that supports subscriber identity module switching based on predicted utility in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include RAM and read-only memory (ROM). The at least one memory 930 may store computer-readable, computer-executable code 935 including instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein.

In some cases, the at least one memory 930 may contain, among other things, a basic I/O system (BIOS) which may control basic hardware or software operation such as the interaction with peripheral components or devices.

The at least one processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting subscriber identity module switching based on predicted utility). For example, the device 905 or a component of the device 905 may include at least one processor 940 and at least one memory 930 coupled with or to the at least one processor 940, the at least one processor 940 and at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. For example, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code stored in the at least one memory 930 or otherwise, to perform one or more of the functions described herein.

The communications manager 920 may support wireless communications in accordance with examples as disclosed herein. For example, the communications manager 920 is capable of, configured to, or operable to support a means for evaluating, for each respective zone of a set of multiple zones along a route of the UE, a first utility value for a first SIM of the UE associated with a first service subscription and a second utility value for a second SIM of the UE associated with a second service subscription, the first utility value being based on a throughput level and a network load associated with the first service subscription for the each respective zone and the second utility value being based on a throughput level and a network load associated with the second service subscription for the each respective zone, where the set of multiple zones includes at least a first subset of zones through which the UE is predicted to travel. The communications manager 920 is capable of, configured to, or operable to support a means for comparing, for each respective zone of the set of multiple zones, the first utility value of the first service subscription to the second utility value of the second service subscription to determine a service subscription switch condition for each respective zone. The communications manager 920 is capable of, configured to, or operable to support a means for switching, within a first zone of the set of multiple zones, between the first SIM of the UE and the second SIM of the UE based at least in part on a function of the service subscription switch conditions for the set of multiple zones, the first zone including the UE.

By including or configuring the communications manager 920 in accordance with examples as described herein, the device 905 may support techniques for a UE to dynamically switch between SIMs along a route to support improved communication reliability, reduced latency, improved user experience related to reduced processing, reduced power consumption, more efficient utilization of communication resources, improved coordination between devices, and an improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of subscriber identity module switching based on predicted utility as described herein, or the at least one processor 940 and the at least one memory 930 may be otherwise configured to, individually or collectively, perform or support such operations.

FIG. 10 shows a flowchart illustrating a method 1000 that supports subscriber identity module switching based on predicted utility in accordance with one or more aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include evaluating, for each respective zone of a set of multiple zones along a route of the UE, a first utility value for a first SIM of the UE associated with a first service subscription and a second utility value for a second SIM of the UE associated with a second service subscription, the first utility value being based on a throughput level and a network load associated with the first service subscription for the each respective zone and the second utility value being based on a throughput level and a network load associated with the second service subscription for the each respective zone, where the set of multiple zones includes at least a first subset of zones through which the UE is predicted to travel. The operations of block 1005 may be performed in accordance with examples as disclosed herein. In some examples, aspects of the operations of 1005 may be performed by a utility value evaluation component 825 as described with reference to FIG. 8.

At 1010, the method may include comparing, for each respective zone of the set of multiple zones, the first utility value of the first service subscription to the second utility value of the second service subscription to determine a service subscription switch condition for each respective zone. The operations of block 1010 may be performed in accordance with examples as disclosed herein. In some examples, aspects of the operations of 1010 may be performed by a utility value comparison component 830 as described with reference to FIG. 8.

At 1015, the method may include switching, within a first zone of the set of multiple zones, between the first SIM of the UE and the second SIM of the UE based on a function of the service subscription switch conditions for the set of multiple zones, the first zone including the UE. The operations of block 1015 may be performed in accordance with examples as disclosed herein. In some examples, aspects of the operations of 1015 may be performed by an SIM switching component 835 as described with reference to FIG. 8.

Aspect 1: A method for wireless communications by a UE, comprising: evaluating, for each respective zone of a plurality of zones along a route of the UE, a first utility value for a first SIM of the UE associated with a first service subscription and a second utility value for a second SIM of the UE associated with a second service subscription, the first utility value being based at least in part on a throughput level and a network load associated with the first service subscription for the each respective zone and the second utility value being based at least in part on a throughput level and a network load associated with the second service subscription for the each respective zone, wherein the plurality of zones comprises at least a first subset of zones through which the UE is predicted to travel; comparing, for each respective zone of the plurality of zones, the first utility value of the first service subscription to the second utility value of the second service subscription to determine a service subscription switch condition for each respective zone; and switching, within a first zone of the plurality of zones, between the first SIM of the UE and the second SIM of the UE based at least in part on a function of the service subscription switch condition s for the plurality of zones, the first zone comprising the UE.

Aspect 2: The method of aspect 1, further comprising: calculating, for each zone of the plurality of zones, a hysteresis value to be used to determine the service subscription switch condition for each zone of the plurality of zones.

Aspect 3: The method of any of aspects 1 through 2, further comprising: evaluating, for each respective zone of the plurality of zones, a first service subscription cost for the first service subscription associated with the first SIM and a second service subscription cost for the second service subscription associated with the second SIM.

Aspect 4: The method of aspect 3, wherein the service subscription switch condition, for each respective zone of the plurality of zones, is determined based at least in part on a hysteresis value that is based at least in part a service subscription cost of a respective service subscription of a respective SIM that is active at the UE.

Aspect 5: The method of any of aspects 3 through 4, further comprising: comparing, for each respective zone of the plurality of zones, both the first utility value of the first service subscription that is associated with the first service subscription cost and the second utility value of the second service subscription that is associated with the second service subscription cost to a utility value threshold, the second service subscription cost being different from the first service subscription cost, wherein a hysteresis value to be used to determine the service subscription switch condition for each zone of the plurality of zones is based at least in part on the first utility value, the second utility value, or both satisfying the utility value threshold and on a service subscription cost of a respective service subscription of a respective SIM that is active at the UE.

Aspect 6: The method of any of aspects 1 through 5, wherein comparing the first utility value to the second utility value comprises: calculating one or more metrics including a quantity of service subscription switches over the route, an average rate of service subscription switches, an average quantity of zones between service subscription switches, an average utility of the route with one or more service subscription switches, an average utility of the route for the first service subscription, an average utility of the route for the second service subscription, or any combination thereof, wherein the service subscription switch condition is based at least in part on the one or more metrics.

Aspect 7: The method of any of aspects 1 through 6, further comprising: calculating a hysteresis value to be used to determine the service subscription switch condition for each zone of the plurality of zones, a quantity of zones in the first subset of zones, or both, based at least in part on a quantity of service subscription switches performed before the first zone of the plurality of zones satisfying a threshold quantity of service subscription switches.

Aspect 8: The method of any of aspects 1 through 7, further comprising: comparing, for each respective zone of the plurality of zones, the first utility value of the first service subscription and the second utility value of the second service subscription to a utility value threshold, wherein a hysteresis value to be used to determine the service subscription switch condition for each zone of the plurality of zones is based at least in part on the first utility value, the second utility value, or both satisfying the utility value threshold.

Aspect 9: The method of any of aspects 1 through 8, further comprising: assigning, for each respective zone of the plurality of zones, a respective weight to the service subscription switch condition for each respective zone; and calculating, for each respective zone of the plurality of zones, a service subscription switch metric that is based at least in part on the respective weight assigned to each respective service subscription switch condition for each respective zone and each respective service subscription switch condition for each respective zone, wherein switching between the first SIM of the UE and the second SIM of the UE in the first zone is based at least in part on the service subscription switch metric for the first zone satisfying a service subscription switch metric threshold.

Aspect 10: The method of any of aspects 1 through 9, wherein a quantity of zones in the first subset of zones of the plurality of zones is based at least in part on a speed of movement of the UE.

Aspect 11: The method of any of aspects 1 through 10, wherein switching between the first SIM of the UE and the second SIM of the UE is based at least in part on the function of the service subscription switch condition for each respective zone indicating for the UE to switch between the first SIM of the UE and the second SIM of the UE.

Aspect 12: The method of any of aspects 1 through 11, wherein each respective zone of the plurality of zones is based at least in part on respective sets of geographic coordinates for each respective zone of the plurality of zones.

Aspect 13: A UE for wireless communications, comprising one or more memories storing processor-executable code, and one or more processors coupled with the one or more memories and individually or collectively operable to execute the code to cause the UE to perform a method of any of aspects 1 through 12.

Aspect 14: A UE for wireless communications, comprising at least one means for performing a method of any of aspects 1 through 12.

Aspect 15: A non-transitory computer-readable medium storing code for wireless communications, the code comprising instructions executable by one or more processors to perform a method of any of aspects 1 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the code to cause the UE to:
evaluate, for each respective zone of a plurality of zones along a route of the UE, a first utility value for a first subscriber identity module (SIM) of the UE associated with a first service subscription and a second utility value for a second SIM of the UE associated with a second service subscription, the first utility value being based at least in part on a throughput level and a network load associated with the first service subscription for the each respective zone and the second utility value being based at least in part on a throughput level and a network load associated with the second service subscription for the each respective zone, wherein the plurality of zones comprises at least a first subset of zones through which the UE is predicted to travel;
compare, for each respective zone of the plurality of zones, the first utility value of the first service subscription to the second utility value of the second service subscription to determine a service subscription switch condition for each respective zone; and
switching, within a first zone of the plurality of zones, between the first SIM of the UE and the second SIM of the UE based at least in part on a function of the service subscription switch conditions for the plurality of zones, the first zone comprising the UE.

2. The UE of claim 1, wherein the one or more processors are individually or collectively further operable to execute the code to cause the UE to:
calculate, for each zone of the plurality of zones, a hysteresis value to be used to determine the service subscription switch condition for each zone of the plurality of zones.

3. The UE of claim 1, wherein the one or more processors are individually or collectively further operable to execute the code to cause the UE to:
evaluate, for each respective zone of the plurality of zones, a first service subscription cost for the first service subscription associated with the first SIM and a second service subscription cost for the second service subscription associated with the second SIM.

4. The UE of claim 3, wherein the service subscription switch condition, for each respective zone of the plurality of zones, is determined based at least in part on a hysteresis value that is based at least in part on a service subscription cost of a respective service subscription of a respective SIM that is active at the UE.

5. The UE of claim 3, wherein the one or more processors are individually or collectively further operable to execute the code to cause the UE to:
compare, for each respective zone of the plurality of zones, both the first utility value of the first service subscription that is associated with the first service subscription cost and the second utility value of the second service subscription that is associated with the second service subscription cost to a utility value threshold, the second service subscription cost being different from the first service subscription cost, wherein a hysteresis value to be used to determine the service subscription switch condition for each zone of the plurality of zones is based at least in part on the first utility value, the second utility value, or both satisfying the utility value threshold and on a service subscription cost of a respective service subscription of a respective SIM that is active at the UE.

6. The UE of claim 1, wherein, to compare the first utility value to the second utility value, the one or more processors are individually or collectively operable to execute the code to cause the UE to:
calculate one or more metrics including a quantity of service subscription switches over the route, an average rate of service subscription switches, an average quantity of zones between service subscription switches, an average utility of the route with one or more service subscription switches, an average utility of the route for the first service subscription, an average utility of the route for the second service subscription, or any combination thereof, wherein the service subscription switch condition is based at least in part on the one or more metrics.

7. The UE of claim 1, wherein the one or more processors are individually or collectively further operable to execute the code to cause the UE to:

calculate a hysteresis value to be used to determine the service subscription switch condition for each zone of the plurality of zones, a quantity of zones in the first subset of zones, or both, based at least in part on a quantity of service subscription switches performed before the first zone of the plurality of zones satisfying a threshold quantity of service subscription switches.

8. The UE of claim 1, wherein the one or more processors are individually or collectively further operable to execute the code to cause the UE to:

compare, for each respective zone of the plurality of zones, the first utility value of the first service subscription and the second utility value of the second service subscription to a utility value threshold, wherein a hysteresis value to be used to determine the service subscription switch condition for each zone of the plurality of zones is based at least in part on the first utility value, the second utility value, or both satisfying the utility value threshold.

9. The UE of claim 1, wherein the one or more processors are individually or collectively further operable to execute the code to cause the UE to:

assign, for each respective zone of the plurality of zones, a respective weight to the service subscription switch condition for each respective zone; and calculate, for each respective zone of the plurality of zones, a service subscription switch metric that is based at least in part on the respective weight assigned to each respective service subscription switch condition for each respective zone and each respective service subscription switch condition for each respective zone, wherein switching between the first SIM of the UE and the second SIM of the UE in the first zone is based at least in part on the service subscription switch metric for the first zone satisfying a service subscription switch metric threshold.

10. The UE of claim 1, wherein a quantity of zones in the first subset of zones of the plurality of zones is based at least in part on a speed of movement of the UE.

11. The UE of claim 1, wherein switching between the first SIM of the UE and the second SIM of the UE is based at least in part on the function of the service subscription switch condition for each respective zone indicating for the UE to switch between the first SIM of the UE and the second SIM of the UE.

12. The UE of claim 1, wherein each respective zone of the plurality of zones is based at least in part on respective sets of geographic coordinates for each respective zone of the plurality of zones.

13. A method for wireless communications by a user equipment (UE), comprising:

evaluating, for each respective zone of a plurality of zones along a route of the UE, a first utility value for a first subscriber identity module (SIM) of the UE associated with a first service subscription and a second utility value for a second SIM of the UE associated with a second service subscription, the first utility value being based at least in part on a throughput level and a network load associated with the first service subscription for the each respective zone and the second utility value being based at least in part on a throughput level and a network load associated with the second service subscription for the each respective zone, wherein the plurality of zones comprises at least a first subset of zones through which the UE is predicted to travel;

comparing, for each respective zone of the plurality of zones, the first utility value of the first service subscription to the second utility value of the second service subscription to determine a service subscription switch condition for each respective zone; and switching, within a first zone of the plurality of zones, between the first SIM of the UE and the second SIM of the UE based at least in part on a function of the service subscription switch conditions for the plurality of zones, the first zone comprising the UE.

14. The method of claim 13, further comprising:

calculating, for each zone of the plurality of zones, a hysteresis value to be used to determine the service subscription switch condition for each zone of the plurality of zones.

15. The method of claim 13, further comprising:

evaluating, for each respective zone of the plurality of zones, a first service subscription cost for the first service subscription associated with the first SIM and a second service subscription cost for the second service subscription associated with the second SIM.

16. The method of claim 13, wherein switching between the first SIM of the UE and the second SIM of the UE is based at least in part on the function of the service subscription switch condition for each respective zone indicating for the UE to switch between the first SIM of the UE and the second SIM of the UE.

17. A user equipment (UE) for wireless communications, comprising:

means for evaluating, for each respective zone of a plurality of zones along a route of the UE, a first utility value for a first subscriber identity module (SIM) of the UE associated with a first service subscription and a second utility value for a second SIM of the UE associated with a second service subscription, the first utility value being based at least in part on a throughput level and a network load associated with the first service subscription for the each respective zone and the second utility value being based at least in part on a throughput level and a network load associated with the second service subscription for the each respective zone, wherein the plurality of zones comprises at least a first subset of zones through which the UE is predicted to travel;

means for comparing, for each respective zone of the plurality of zones, the first utility value of the first service subscription to the second utility value of the second service subscription to determine a service subscription switch condition for each respective zone; and means for switching, within a first zone of the plurality of zones, between the first SIM of the UE and the second SIM of the UE based at least in part on a function of the service subscription switch conditions for the plurality of zones, the first zone comprising the UE.

18. The UE of claim 17, further comprising:

means for calculating, for each zone of the plurality of zones, a hysteresis value to be used to determine the service subscription switch condition for each zone of the plurality of zones.

19. The UE of claim 17, further comprising:

means for evaluating, for each respective zone of the plurality of zones, a first service subscription cost for the first service subscription associated with the first SIM and a second service subscription cost for the second service subscription associated with the second SIM.

20. The UE of claim 17, wherein switching between the first SIM of the UE and the second SIM of the UE is based at least in part on the function of the service subscription switch condition for each respective zone indicating for the UE to switch between the first SIM of the UE and the second SIM of the UE.

21. The UE of claim 1, wherein the function of the service subscription switch conditions for the plurality of zones aggregates the service subscription switch conditions determined for the plurality of zones including the first subset of zones through which the UE is predicted to travel.

22. The UE of claim 1, wherein, to compare the first utility value to the second utility value to determine the service subscription switch condition for each respective zone, the one or more processors are individually or collectively operable to execute the code to cause the UE to:

compare, for each respective zone of the plurality of zones, the second utility value of the second service subscription to a combination of the first utility value of the first service subscription and a hysteresis value, wherein the service subscription switch condition for each respective zone indicates for the UE to switch between the first SIM and the second SIM when the second utility value exceeds the combination of the first utility value and the hysteresis value for the each respective zone.

23. The UE of claim 1, wherein, to compare the first utility value to the second utility value to determine the service subscription switch condition for each respective zone, the one or more processors are individually or collectively operable to execute the code to cause the UE to:

select, for each respective zone of the plurality of zones, a hysteresis value from a plurality of different hysteresis values based at least in part on which of the first SIM or the second SIM is active at the UE, the service subscription switch condition for each respective zone being based at least in part on the selected hysteresis value.

24. The method of claim 13, further comprising:

comparing, for each respective zone of the plurality of zones, the second utility value of the second service subscription to a combination of the first utility value of the first service subscription and a hysteresis value, wherein the service subscription switch condition for each respective zone indicates for the UE to switch between the first SIM and the second SIM when the second utility value exceeds the combination of the first utility value and the hysteresis value for the each respective zone.

* * * * *